(12) United States Patent
Wakazono et al.

(10) Patent No.: US 9,739,986 B2
(45) Date of Patent: Aug. 22, 2017

(54) ZOOM LENS AND IMAGE PICKUP APPARATUS INCLUDING THE SAME

(71) Applicant: CANON KABUSHIKI KAISHA, Tokyo (JP)

(72) Inventors: Tsuyoshi Wakazono, Utsunomiya (JP); Shoichi Takemoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 14/734,571

(22) Filed: Jun. 9, 2015

(65) Prior Publication Data

US 2015/0362711 A1     Dec. 17, 2015

(30) Foreign Application Priority Data

Jun. 13, 2014 (JP) .................................. 2014-122526
Jun. 13, 2014 (JP) .................................. 2014-122528

(51) Int. Cl.
*G02B 15/14*     (2006.01)
*G02B 15/16*     (2006.01)
*H04N 5/235*     (2006.01)
*G02B 15/17*     (2006.01)
*G02B 15/173*    (2006.01)

(52) U.S. Cl.
CPC .............. *G02B 15/16* (2013.01); *G02B 15/17* (2013.01); *G02B 15/173* (2013.01); *H04N 5/2352* (2013.01)

(58) Field of Classification Search
CPC .... G02B 15/14; G02B 15/161; G02B 13/009; H04N 5/23296
USPC .................................. 359/676–706, 811–830
See application file for complete search history.

(56) References Cited

U.S. PATENT DOCUMENTS

| 2011/0090373 A1 | 4/2011 | Wakazono |
| 2012/0127587 A1 | 5/2012 | Yakita |
| 2012/0262801 A1 | 10/2012 | Nakamura |
| 2014/0049673 A1 | 2/2014 | Nakamura |

(Continued)

FOREIGN PATENT DOCUMENTS

| JP | S63-188110 | 8/1988 |
| JP | H0627381 A | 2/1994 |
| JP | 2001-183584 A | 7/2001 |

(Continued)

OTHER PUBLICATIONS

Partial European Search Report issued in corresponding application No. EP 15001737.4 on Jan. 20, 2016.

(Continued)

*Primary Examiner* — Mahidere Sahle
(74) *Attorney, Agent, or Firm* — Carter, DeLuca, Farrell & Schmidt, LLP

(57) ABSTRACT

Provided is a zoom lens including, in order from an object side: a first lens unit not moving for zooming; a second lens unit moving during the zooming; at least one lens unit moving during the zooming; and a rear lens group. The first lens unit includes a first lens sub unit not moving for focusing, and a second lens sub unit moving during the focusing. The first lens sub unit includes a negative lens and a positive lens. A focal length of the first lens unit, a distance on an optical axis from a lens surface closest to an image side of the first lens sub unit to a rear principal point position of the first lens sub unit, and a focal length of the zoom lens at a telephoto end are appropriately set.

14 Claims, 11 Drawing Sheets

(56) References Cited

U.S. PATENT DOCUMENTS

2014/0049681 A1    2/2014    Shimomura

FOREIGN PATENT DOCUMENTS

| JP | 2004-085846 A | 3/2004 |
| JP | 2007-139858 A | 6/2007 |
| JP | 2011-175185 A | 9/2011 |
| JP | 2012-113082 A | 6/2012 |
| JP | 2014-038238 A | 2/2014 |

OTHER PUBLICATIONS

Japanese Office Action issued in corresponding Japanese Application No. 2014-122526 on Apr. 19, 2016.
Japanese Office Action issued in corresponding Japanese Application No. 2014-122528 on Apr. 21, 2016.
European Search Report issued in corresponding European Application No. 15001737.4 on Apr. 21, 2016.

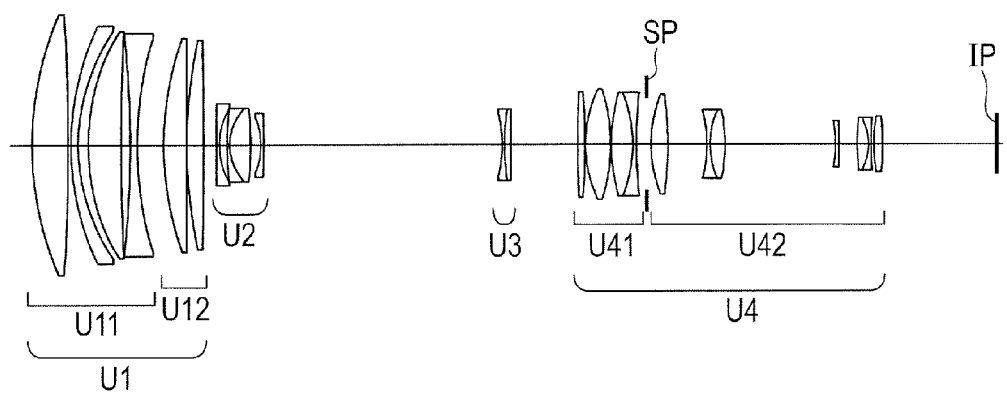
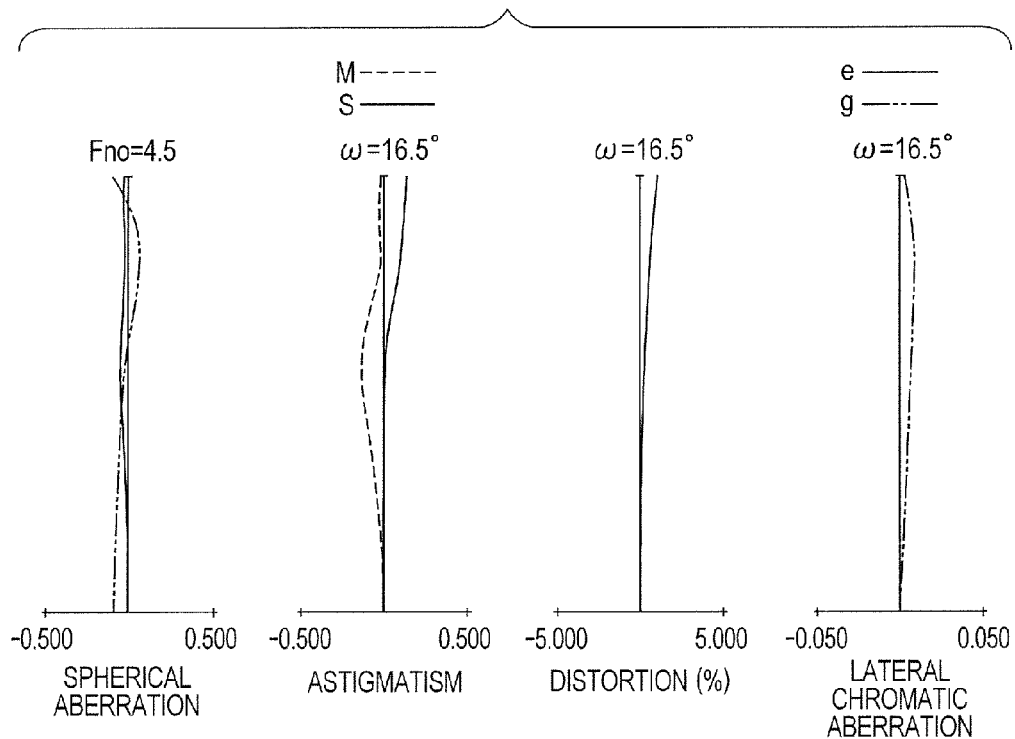

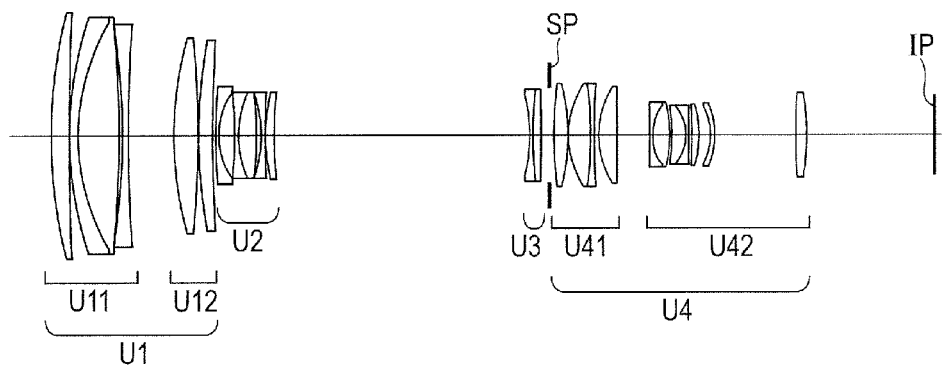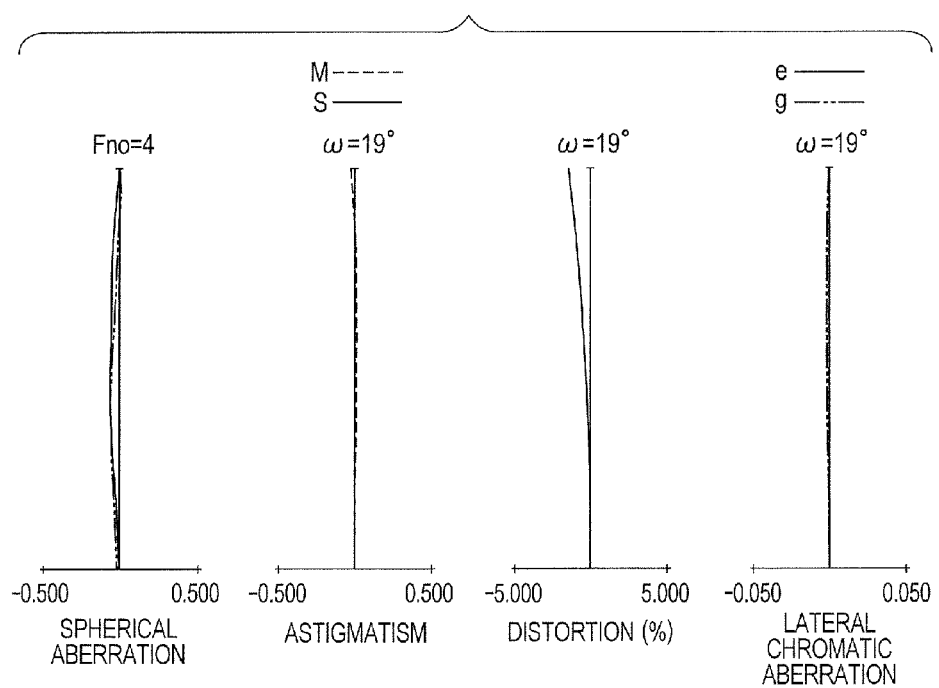

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, which are particularly suitable for use in a broadcasting television camera, a cinema camera, a video camera, and a digital still camera.

Description of the Related Art

In recent years, as an image pickup apparatus such as a television camera, a cinema camera, a video camera, or a film camera, a large format camera having features of a shallow depth of field and beautiful bokeh (blur) quality for expanding visual expression is used. As a zoom lens to be attached to the large format camera, a small and lightweight zoom lens having a large aperture, a high zoom ratio, and high optical performance for securing mobility and improving flexibility in photography and visual expression has been in demand. Especially in photographing, producing, and the like of a nature program, in order to photograph a facial expression of an animal, a bird, or the like from a distance, a telephoto zoom lens capable of covering angle of fields in a super telephoto range has been in demand. As the telephoto zoom lens having the high zoom ratio to be attached to the large format camera, as proposed in Japanese Patent Application Laid-Open No. 2007-139858, Japanese Patent Application Laid-Open No. 2004-085846, and Japanese Patent Application Laid-Open No. 2011-175185, a positive-lead type zoom lens including four or more lens units in total, of which a lens unit having a positive refractive power is arranged closest to an object side, has been known.

In Japanese Patent Application Laid-Open No. 2007-139858, a zoom lens including four lens units and having an angle of field at a telephoto end of about 0.7 degree and a zoom ratio of about 15× has been proposed.

In Japanese Patent Application Laid-Open No. 2004-085846, a zoom lens including four lens units and having an angle of field at a telephoto end of about 1.6 degrees and a zoom ratio of about 3× has been proposed.

In Japanese Patent Application Laid-Open No. 2011-175185, a zoom lens having a magnification ratio of about 5×, and a half angle of field at a telephoto end of about 3 degrees has been disclosed.

In general, when an image size of the image pickup apparatus becomes larger, the zoom lens to be attached thereto is accordingly increased in size. Therefore, as a zoom lens to be attached to a large format camera, in order to attain improvements in mobility and flexibility in photography and attain a large aperture ratio and the high zoom ratio at the same time, reductions in size and weight of the zoom lens become objects to be achieved. In order to reduce the size and weight of the zoom lens, it is important to downsize a first lens unit having a largest lens diameter, and a zooming lens unit, which increases in movement amount as the zoom ratio is increased.

In regard to the zoom lens disclosed in Japanese Patent Application Laid-Open No. 2007-139858, as a problem in adapting to an even larger image pickup element and increasing the zoom ratio while maintaining the large aperture ratio, an effective diameter of the zooming lens unit is increased and a mechanism for driving the zooming lens unit is increased in size, which makes it difficult to downsize the zoom lens.

In regard to the zoom lens disclosed in Japanese Patent Application Laid-Open No. 2004-085846, as a problem in further increasing the zoom ratio, it is difficult to suppress a movement amount of a third lens unit for correcting an image plane, and in addition, a total lens thickness of a first lens unit is large, which makes it difficult to downsize the zoom lens.

In regard to the zoom lens disclosed in Japanese Patent Application Laid-Open No. 2011-175185, in order to realize a further increase in magnification, a movement amount of a second lens unit accompanying zooming is increased, which makes it difficult to realize both the increase in magnification and the reductions in size and weight.

In order to realize both the increase in magnification and the reductions in size and weight, it is important to appropriately set refractive powers of the first lens unit and the second lens unit in particular.

SUMMARY OF THE INVENTION

It is an object of the present invention to attain a zoom lens that is compatible with a large format sensor and realizes both reductions in size and weight while having a large aperture ratio and a high zoom ratio by appropriately defining paraxial refractive power arrangements in a first lens unit and of the first lens unit and lens units involved in zooming.

In order to achieve the above-mentioned object, according to one embodiment of the present invention, there is provided a zoom lens including, in order from an object side to an image side: a first lens unit having a positive refractive power that does not move for zooming; a second lens unit having a negative refractive power that moves during the zooming; at least one lens unit that moves during the zooming; and a rear lens group, in which the first lens unit includes a first lens sub unit that does not move for focusing, and a second lens sub unit having a positive refractive power that moves during the focusing, in which the first lens sub unit includes a negative lens and a positive lens, and in which the following conditions are satisfied:

$$-25.00 < OK11/f1 < -0.10;$$

and $$2.00 < ft/f1 < 7.00,$$

where f1 represents a focal length of the first lens unit, OK11 represents a distance on an optical axis from a lens surface closest to the image side of the first lens sub unit to a rear principal point position of the first lens sub unit, and ft represents a focal length of the zoom lens at a telephoto end, provided that a direction from the object side toward the image side is a positive direction.

According to the one embodiment of the present invention, it is possible to achieve the zoom lens that is compatible with a large format sensor and realizes both the reductions in size and weight while having a large aperture ratio and a high zoom ratio.

Further features of the present invention will become apparent from the following description of exemplary embodiments with reference to the attached drawings.

BRIEF DESCRIPTION OF THE DRAWINGS

FIG. 3 is a lens cross-sectional view in a state in which focus is at infinity at a wide angle end in a zoom lens according to Embodiment 2.

FIG. 4A is a longitudinal aberration diagram in the state in which focus is at infinity at the wide angle end in the zoom lens according to Embodiment 2.

FIG. 5 is a lens cross-sectional view in a state in which focus is at infinity at a wide angle end in a zoom lens according to Embodiment 3.

FIG. 6A is a longitudinal aberration diagram in the state in which focus is at infinity at the wide angle end in the zoom lens according to Embodiment 3.

DESCRIPTION OF THE EMBODIMENTS

Figure 1:
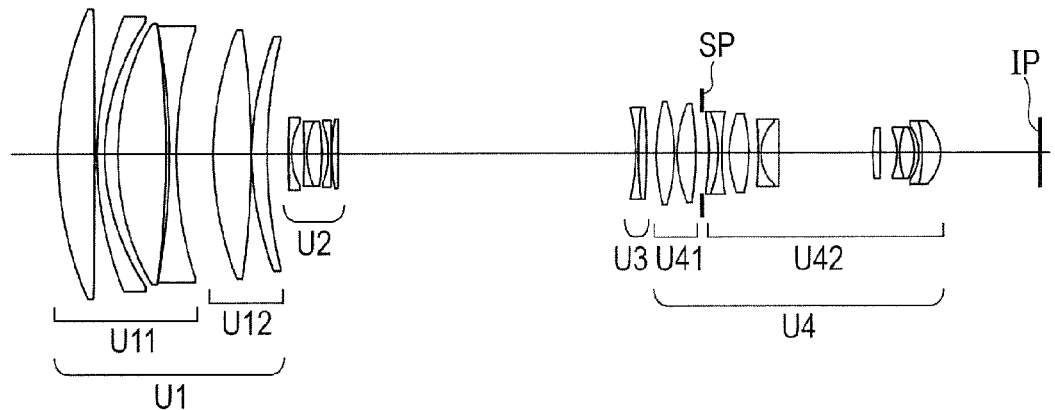
FIG. 1 is a lens cross-sectional view in a state in which focus is at infinity at a wide angle end in a zoom lens according to Embodiment 1.

Now, a zoom lens according to embodiments of the present invention is described in detail with reference to the accompanying drawings.

The zoom lens according to the present invention includes, in order from an object side to an image side, a first lens unit having a positive refractive power, which is configured not to move for zooming. The zoom lens also includes a second lens unit having a negative refractive power, which is configured to move during the zooming, at least one lens unit for the zooming or for correcting an image plane accompanying the zooming, and a rear lens group Ur subsequent to the at least one lens unit. The phrase "lens unit configured not to move for zooming" as used herein means that the lens unit is not driven for the purpose of performing zooming but may move for focusing in a case where the zooming and the focusing are performed at the same time.

In the zoom lens according to each Embodiment, a paraxial refractive power arrangement in the first lens unit and a relationship of paraxial refractive power arrangements of the first lens unit and the second lens unit are appropriately determined to realize, despite a zoom lens having a high zoom ratio and being usable in a super telephoto range, reductions in size and weight even in a case of adapting to a large format sensor.

More specifically, the zoom lens according to the present invention includes, in order from the object side, the first lens unit having a positive refractive power, which is configured not to move for the zooming, the second lens unit having a negative refractive power, which is configured to move during the zooming, at least one lens unit for the zooming or for correcting an image plane accompanying the zooming, and the rear lens group Ur subsequent to the at least one lens unit. The first lens unit includes a first lens sub unit configured to be fixed during focusing (focus adjustment), and a second lens sub unit having a positive refractive power which is configured to move in an optical axis direction during the focusing. The first lens sub unit includes negative lenses and positive lenses. The following conditions are satisfied:

$$-0.30 < OK1/f1 < -0.05 \quad (1);$$

$$-25.00 < OK11/f1 < -0.10 \quad (2);$$

and $$2.00 < ft/f1 < 7.00 \quad (3),$$

where f1 represents a focal length of the first lens unit, OK11 represents a distance from a lens surface closest to an image side of the first lens sub unit to a rear principal point position of the first lens sub unit, OK1 represents a distance from a lens surface closest to the image side of the first lens unit to a rear principal point position of the first lens unit, and ft represents a focal length of the zoom lens at a telephoto end, provided that a direction from the object side toward the image side along the optical axis is a positive direction.

The conditional expression (1) defines a relationship of the focal length f1 of the first lens unit and the distance OK1 from the lens surface closest to the image side of the first lens unit to the rear principal point position of the first lens unit. In the following description, a distance from a lens surface closest to the image side of an i-th lens unit to a rear principal point position of the i-th lens unit is defined as a rear principal point distance of the i-th lens unit for description.

Figure 12:
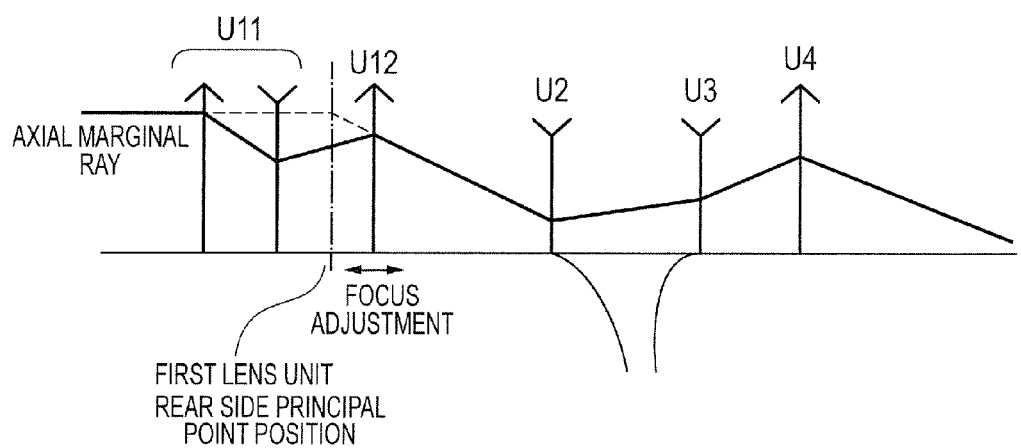
FIG. 12 is an optical path diagram of an axial marginal ray in Embodiment 1.

Now, a detail description is given with reference to FIG. 12. FIG. 12 is a schematic optical path diagram in Embodiment 1. In FIG. 12, a first lens sub unit U11 to a fourth lens unit U4 are illustrated. As illustrated in FIG. 12, the rear principal point position of the first lens unit is displaced toward the object side to increase a principal point interval between the first lens unit and the second lens unit, with the result that a diameter of a light flux that enters the second lens unit may be reduced, which allows an increase in aperture. Moreover, reducing a diameter of the second lens unit and sizes of a lens barrel and the like for holding and driving the second lens unit is facilitated. However, in order to displace the rear principal point position of the first lens unit toward the object side, refractive powers of a lens unit having a positive power and a lens unit having a negative refractive power, which are arranged on the object side and the image side in the first lens unit, respectively, need to be increased. This disadvantageously generates high order aberrations such as a spherical aberration, a coma, and an axial chromatic aberration.

In view of the above, appropriate setting of a ratio of the focal length of the first lens unit to the distance from the lens surface closest to the image side of the first lens unit to the rear principal point position of the first lens unit is required to realize both the reductions in size and weight and the high performance.

When the ratio exceeds the upper limit of the conditional expression (1), a displacement amount of the rear principal point position of the first lens unit toward the object side becomes too small to enlarge lens diameters of the first and subsequent lens units and mechanisms for holding and driving the first and subsequent lens units, which makes it difficult to attain the reductions in size and weight. When the ratio falls below the lower limit of the conditional expression (1), the displacement amount of the rear principal point position of the first lens unit toward the object side becomes too large, which makes it difficult to correct the high order aberrations generated due to the increased refractive powers of the lens units in the first lens unit as described above.

The conditional expression (2) defines a relationship of the focal length f1 of the first lens unit and a rear principal point distance of the first lens sub unit.

When the ratio exceeds the upper limit of the conditional expression (2), a displacement amount of the rear principal point position of the first lens sub unit toward the object side becomes too large, which makes it difficult to correct the high order aberrations generated due to the increased refractive powers of the lens units in the first lens sub unit as described above. When the ratio falls below the lower limit of the conditional expression (2), the displacement amount of the rear principal point position of the first lens unit toward the object side becomes too small to enlarge the lens diameters of the first and subsequent lens units and the mechanisms for holding and driving the first and subsequent lens units, which makes it difficult to attain the reductions in size and weight.

In the present invention, the first lens sub unit is given the role of significantly displacing the rear principal point position of the first lens unit toward the object side. In a case where the role of displacing the rear principal point position of the first lens unit toward the object side is shared with the second lens sub unit, an element having a negative refractive power needs to be arranged in the second lens sub unit as described above. In the case where the element having the negative refractive power is arranged in the second lens sub unit, the number of lenses becomes large for correcting various aberrations such as the axial chromatic aberration and the spherical aberration in the lens unit, and hence the second lens sub unit is relatively increased in size. The second lens sub unit is a lens unit configured to move in performing a focus adjustment, which leads to an increase in size of mechanisms for driving the lenses, and hence to an increase in power consumption for the driving and a further increase in weight.

The conditional expression (3) defines a ratio of the focal length at the telephoto end in the zoom lens to the focal length of the first lens unit to define a condition for realizing both the reductions in size and weight and the high magnification and high performance.

In order to realize both the reductions in size and weight and the increase in magnification, it is desired to set the focal length f1 of the first lens unit small. This is because, when f1 is set small, an image point position of the first lens unit and hence an object point position of the second lens unit approaches the second lens unit, with the result that an amount of stroke required for the zooming may be reduced.

However, when the focal length f1 of the first lens unit is set small, in order to obtain a focal length fm in a predetermined zoom lens, imaging magnifications of the first and subsequent lens units need to be set large as shown in the following expression (A):

$$fm = f1 \times \beta 2m \times \beta 3m \times \beta r \tag{A},$$

where $\beta 2m$ represents an imaging magnification of the second lens unit, $\beta 3m$ represents an imaging magnification of a third lens unit, and $\beta r$ represents an imaging magnification of the fourth lens unit.

When the imaging magnifications of the first and subsequent lens units are large, an enlargement ratio of the spherical aberration, the axial chromatic aberration, and the like, which are generated in the first lens unit especially at the telephoto end, is increased, which makes it difficult to attain the increased performance. In view of the above, it is required to set the focal length of the first lens unit in an appropriate range in order to attain the reductions in size and weight and the high magnification and high performance.

When the ratio exceeds the upper limit of the conditional expression (3), the focal length of the first lens unit with respect to the focal length at the telephoto end in the zoom lens becomes too small, which makes it difficult to attain the increased performance. When the ratio falls below the lower limit of the conditional expression (3), the focal length of the first lens unit with respect to the focal, length at the telephoto end in the zoom lens becomes too large, which makes it difficult to attain the reductions in size and weight and the increase in magnification.

It is preferred to set the numerical value ranges of the conditional expressions (1) to (3) as follows:

$$-0.29 < OK1/f1 < -0.07 \tag{1a}.$$

It is more preferred to satisfy the following conditions:

$$-0.29 < OK1/f1 < -0.1 \tag{1b};$$

and $$-25.00 < OK11/f1 < -0.40 \tag{2a}.$$

It is further preferred to satisfy the following conditions:

$$-20.00 < OK11/f1 < -0.80 \tag{2b};$$

and $$2.40 < ft/f1 < 6.3 \tag{3a}.$$

In each Embodiment, it is further preferred to satisfy one or more of the following conditions.

In another aspect of the zoom lens according to the present invention, a relationship of dispersions of optical materials used in the first lens sub unit is defined. It is preferred to satisfy the following conditional expression:

$$20.00 < vd11p - vd11n < 48.00 \tag{4},$$

where vd11p represents an average value of Abbe constants of the positive lenses included in the first lens sub unit, and vd11n represents an average value of Abbe constants of the negative lenses included in the first lens sub unit.

The conditional expression (4) is satisfied to facilitate the realization of both the correction of the axial chromatic aberration at the telephoto end and the downsizing. When vd11p−vd11n exceeds the upper limit of the conditional expression (4), a lateral chromatic aberration in the first lens sub unit is advantageously corrected, but refractive powers of the lenses forming the first lens sub unit become weak, and the rear principal point position of the first lens sub unit is difficult to displace far to the object side, which makes it difficult to downsize. When vd11p−vd11n falls below the lower limit of the conditional expression (4), in order to correct the axial chromatic aberration at the telephoto end, the refractive powers of the negative lenses become too strong, and as a result of curvature radii of the lens surfaces becoming small, the high order aberrations of the spherical aberration at the telephoto end are increased, which makes it difficult to obtain good optical performance.

It is more preferred to set the numerical value range of the conditional expression (4) as follows:

$$20.00 < vd11p - vd11n < 45.00 \quad (4a).$$

It is further preferred to satisfy the following condition:

$$23.00 < vd11p - vd11n < 42.00 \quad (4b).$$

In a further aspect of the zoom lens according to the present invention, an average value of dispersions of optical materials used in the second lens sub unit is defined. It is preferred to satisfy the following conditional expression:

$$70.00 < vd12 < 100.00 \quad (5),$$

where vd12 represents an average value of Abbe constants of lenses forming the second lens sub unit.

The conditional expression (5) may be satisfied to suppress a variation in axial chromatic aberration during the focus adjustment. When vd12 exceeds the upper limit of the conditional expression (5), a variation in lateral chromatic aberration during focusing is advantageously suppressed, but the axial chromatic aberration at the telephoto end is overcorrected, which makes it difficult to obtain the good optical performance. When vd12 falls below the lower limit of the conditional expression (5), the axial chromatic aberration at the telephoto end and the axial chromatic aberration during the focusing become difficult to correct, and the good optical performance cannot be obtained.

It is more preferred to set the numerical value range of the conditional expression (5) as follows:

$$75.00 < vd12 < 97.00 \quad (5a).$$

In a further aspect of the zoom lens according to the present invention, a lens arrangement in the first lens sub unit is defined. It is preferred that the first lens sub unit include a positive lens as a lens closest to the object side, and a negative lens as a lens closest to the image side. The negative lens is arranged closest to the image side to facilitate increasing the rear principal point distance of the first lens sub unit more in a negative direction. Moreover, the positive lens is arranged closest to the object side to facilitate increasing the rear principal point distance of the first lens sub unit in the negative direction. In a case where a configuration in which increasing the rear principal point position in the negative direction is disadvantageous is adopted, in order to displace the rear principal point position, refractive powers of the negative lenses become extremely strong, which becomes the cause of significant generation of the axial chromatic aberration and the higher spherical aberration, and hence makes it difficult to obtain the good optical performance.

In a further aspect of the zoom lens according to the present invention, the lens arrangement in the first lens sub unit is defined in detail. It is preferred that the first lens sub unit include, in order from the object side to the image side, a positive lens, a negative lens, a positive lens, and a negative lens. The lenses may be arranged in the stated order to facilitate increasing the rear principal point distance of the first lens sub unit in the negative direction, and in addition, satisfactorily correct the spherical aberration and the axial chromatic aberration, which are generated by the surfaces, with the result that high optical performance may be obtained at the telephoto end.

In a further aspect of the zoom lens according to the present invention, a relationship of the focal length of the first lens unit and a focal length of the second lens unit is defined. It is preferred to satisfy the following conditional expression:

$$-8.00 < f1/f2 < -3.00 \quad (6),$$

where f2 represents the focal length of the second lens unit.

The conditional expression (6) is satisfied to reduce a movement amount of the second lens unit accompanying the zooming while satisfactorily correcting the axial chromatic aberration, and a total lens length is reduced while attaining the increase in magnification. When the ratio exceeds the upper limit of the conditional expression (6), the focal length of the second lens unit becomes relatively long, with the result that the movement amount of the second lens unit during the zooming is increased to increase the size of the zoom lens, which makes it difficult to reduce the size and weight. When the ratio falls below the lower limit of the conditional expression (6), the focal length of the second lens unit becomes relatively short, which is advantageous in downsizing, but increases aberration variations accompanying the zooming.

It is more preferred to set the numerical value range of the conditional expression (6) as follows:

$$-8.00 < f1/f2 < -4.00 \quad (6a).$$

It is further preferred to satisfy the following condition:

$$-7.30 < f1/f2 < -4.00 \quad (6b).$$

In a further aspect of the zoom lens according to the present invention, relative partial dispersions of optical materials to be used for the second lens unit are defined. In this case, it is preferred to satisfy the following conditional expression:

$$-2.50 \times 10^{-3} < (\theta 2p - \theta 2n)/(v2p - v2n) < -0.50 \times 10^{3} \quad (7)$$

where ν2p and θ2p represent average values of Abbe constants and relative partial dispersions of positive lenses forming the second lens unit, respectively, and ν2n and θ2n represent average values of Abbe constants and relative partial dispersions of negative lenses, respectively.

Here, the Abbe constants and the relative partial dispersions of the materials of the optical device (lens) used in the present invention are defined as follows. Refractive indices with respect to a g-line (435.8 nm), an F-line (486.1 nm), a d-line (587.6 nm), and a C-line (656.3 nm) of Fraunhofer line are denoted by Ng, NF, Nd, and NC, respectively. The Abbe constant νd and the relative partial dispersion θgF with respect to the g-line and the F-line are defined by the following expressions.

$$\nu d = (Nd-1)/(NF-NC) \tag{B}$$

$$\theta gF = (Ng-NF)/(NF-NC) \tag{C}$$

The relative partial dispersion θgF of an existing optical material is present in a narrow range with respect to the Abbe constant νd. Further, the existing optical material has a tendency that, as the Abbe constant νd becomes smaller, the relative partial dispersion θgF becomes greater, that is, as the Abbe constant νd becomes larger, the refractive index becomes lower.

The condition of the conditional expression (7) is defined so as to reduce an amount of the lateral chromatic aberration generated in the second lens unit. When the condition of an upper limit of the conditional expression (7) is not satisfied, a secondary spectrum of the lateral chromatic aberration is advantageously corrected, but refractive indices of negative lenses forming the second lens unit become low to reduce radii of curvature of the negative lenses. As a result, high order aberrations of a curvature of field and the coma increase, which makes it difficult to achieve good optical performance. When the condition of a lower limit of the conditional expression (7) is not satisfied, the secondary spectrum of the lateral chromatic aberration is increased, which makes it difficult to satisfactorily correct chromatic aberrations. It is more preferred to set the numerical value range of the conditional expression (7) as follows:

$$-2.0 \times 10^{-3} < (\theta 2p - \theta 2n)/(\nu 2p - \nu 2n) < -0.80 \times 10^{-3} \tag{7a}$$

In a further aspect of the zoom lens according to the present invention, relative partial dispersions of optical materials used in the first lens unit are defined. The following conditional expression is satisfied, $$-8.00 \times 10^{-4} < (\theta 1p - \theta 1n)/(\nu 1p - \nu 1n) < -1.50 \times 10^{-4} \tag{8}$$

where ν1p and θ1p represent average values of Abbe constants and relative partial dispersions of positive lenses forming the first lens unit, respectively, and ν1n and θ1n represent average values of Abbe constants and relative partial dispersions of negative lenses forming the first lens unit, respectively.

The conditional expression (8) is defined so as to achieve the correction of the axial chromatic aberration at the telephoto end and high optical performance.

When the ratio exceeds the upper limit of the conditional expression (8), the secondary spectrum of the axial chromatic aberration at the telephoto end is advantageously corrected, but refractive indices of positive lenses forming the second lens unit are reduced, with the result that radii of curvature of the positive lenses forming the second lens unit become small. As a result, a high order aberration of the spherical aberration at the telephoto end is increased, which makes it difficult to achieve the good optical performance. When the ratio exceeds the lower limit of the conditional expression (8), the secondary spectrum of the axial chromatic aberration at the telephoto end is increased, which makes it difficult to satisfactorily correct chromatic aberrations at the telephoto end. It is more preferred to set the numerical value range of the conditional expression (8) as follows:

$$-6.5 \times 10^{-4} < (\theta 1p - \theta 1n)/(\nu 1p - \nu 1n) < -2.0 \times 10^{-4} \tag{8a}$$

In a further aspect of the present invention, it is preferred to satisfy the following conditional expression, $$-1.5 < f2/(2 \times fw \times \tan(\omega\_W)) < -0.7 \tag{9}$$

where fw represents a focal length of the zoom lens at a wide angle end, and ω_W represents a half angle of field at the wide angle end of the zoom lens.

The conditional expression (9) defines a ratio of the focal length of the second lens unit to the half angle of field at the wide angle end to satisfactorily correct the aberration variations of the zoom lens, and defines a condition in which both the high magnification ratio and the reductions in size and weight may be realized.

When the ratio exceeds the upper limit of the conditional expression (9), the focal length of the second lens unit becomes too small, which makes it difficult to correct the variations in aberrations such as the spherical aberration and the axial chromatic aberration. When the ratio falls below the lower limit of the conditional expression (9), the focal length of the second lens unit becomes too large, and movement amounts of zooming lens units are increased, which makes it difficult to realize both the increase in magnification and the reductions in size and weight.

In a further aspect of the present invention, it is preferred that an imaging magnification Br of a final lens unit Ur including an aperture stop and having a positive refractive power, which is configured not to move for the zooming, satisfy the following conditional expression:

$$-3.0 < \beta r < -1.8 \tag{10}$$

The conditional expression (10) defines βr to define a condition for realizing both the reductions in size and weight and the high magnification and high performance. In order to attain the increased performance, it is desired to suppress variations in various aberrations, which are generated in movable zooming lens units, due to zooming. To that end, it is necessary to set βr small.

On the other hand, when βr is set small, imaging magnifications of the movable zooming lens units are increased by the expression (A). Therefore, an entrance pupil position, which is a conjugate position of the stop, is arranged on the image side. Therefore, a pupil paraxial ray height of the first lens unit U1 at the wide angle end becomes high to enlarge a lens diameter, which makes it difficult to attain the reductions in size and weight.

As described above, setting βr in an appropriate range is required to realize both the reductions in size and weight and the increased performance.

When βr exceeds the upper limit of the conditional expression (10), the imaging magnification of the final lens unit becomes too small, and the entrance pupil position at the wide angle end is arranged on the image side to increase the lens diameter of the first lens unit, which makes it difficult to attain the reductions in size and weight. When βr falls below the lower limit of the conditional expression (10), the imaging magnification of the final lens unit becomes too large, and the variations in various aberrations, which are generated in the movable zooming lens unit, due to the zooming is increased, which makes it difficult to attain the increased performance.

It is more preferred to set the conditional expression (10) as follows:

$$-2.7 < \beta r < -1.8 \tag{10a}$$

A specific configuration of the zoom lens of the present invention is described below by way of features of lens configurations of Embodiments 1 to 5 and Numerical Embodiments 1 to 5 corresponding thereto, respectively.

Embodiment 1

Figure 2A:
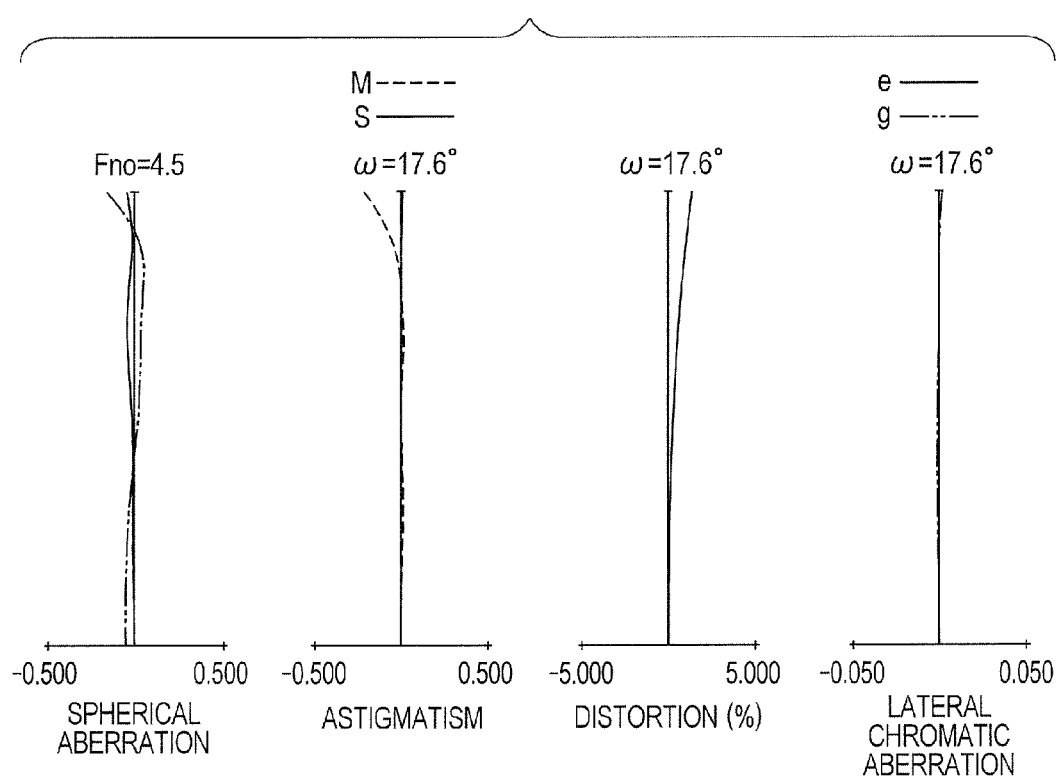
FIG. 2A is a longitudinal aberration diagram in the state in which focus is at infinity at the wide angle end in the zoom lens according to Embodiment 1.
Figure 2B:
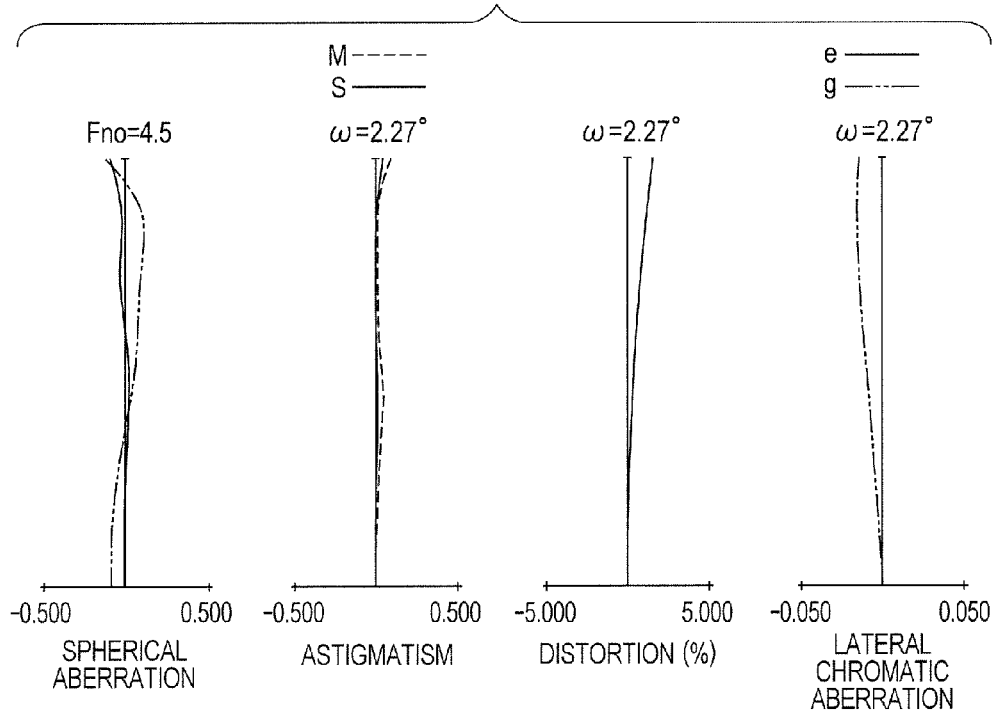
FIG. 2B is a longitudinal aberration diagram in the state in which focus is at infinity at a focal length of 400 Mm in the zoom lens according to Embodiment 1.
Figure 2C:
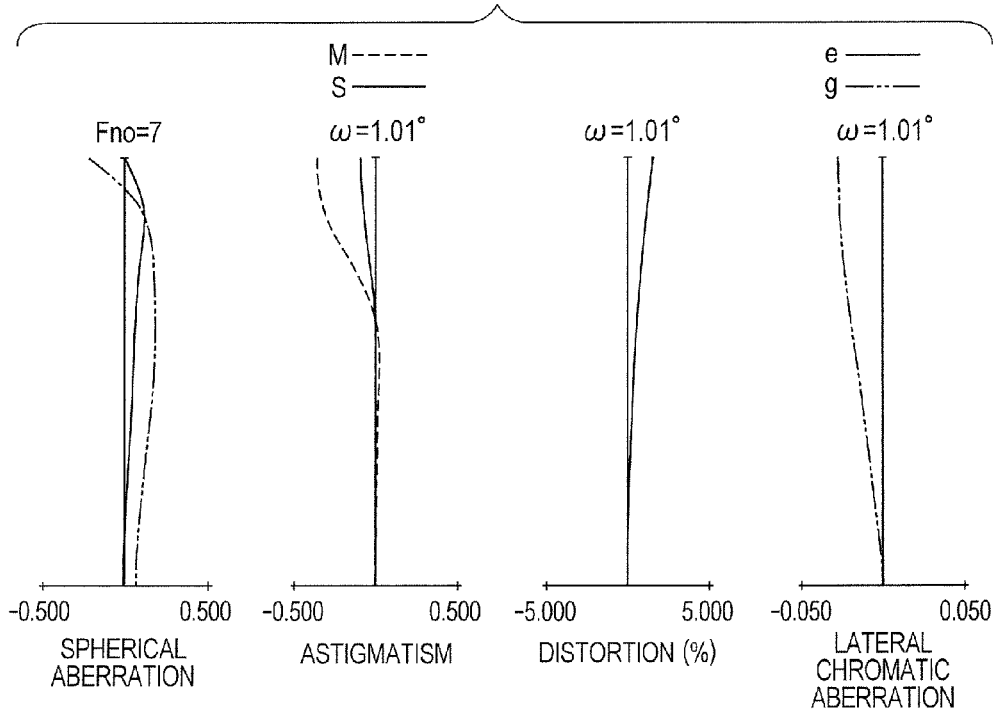
FIG. 2C is a longitudinal aberration diagram in the state in which focus is at infinity at a telephoto end in the zoom lens according to Embodiment 1.

FIG. 1 is a lens cross-sectional view when focus is at an object at infinity at the wide angle end (short focal length end) in Numerical Embodiment 1 as Embodiment 1 of the zoom lens according to the present invention. FIG. 2A, FIG. 2B, and FIG. 2C are aberration diagrams in a state in which focus is at infinity at the wide angle end, a zoom position having a focal length of 400 mm, and the telephoto end, respectively. In lens cross-sectional views, the left side is a subject (object) side (front side), and the right side is the image side (rear side). A first lens unit U1 having a positive refractive power is configured not to move. The first lens unit U1 includes the following sub units in order from the object side to the image side: a first lens sub unit U11 having a positive refractive power, and a second lens sub unit U12 having a positive refractive power. The second lens sub unit U12 having the positive refractive power is moved in the optical axis direction to perform the focus adjustment. A second lens unit U2 having a negative refractive power is configured to move during zooming, and is moved on the optical axis toward the image plane side to perform zooming from the wide angle end to the telephoto end. A third lens unit U3 is configured to move during the zooming, and is moved on the optical axis from the wide angle end to the telephoto end. A fixed lens group (rear lens group) U4 is a fourth lens unit (relay lens unit) having a positive refractive power. The fourth lens unit includes the following sub units in order from the object side to the image side: a first lens sub unit U41 having a positive refractive power, and a second lens sub unit U42 having a positive refractive power, and a fixed aperture stop SP is placed between the first lens sub unit U41 and the second lens sub unit U42. In the fourth lens unit U4, a converter (extender) for converting the focal length or the like may be mounted. An image plane IP corresponds to the imaging surface such as a solid-state image pickup element or a film surface.

In the aberration diagrams, the straight line and the two-dot chain line in the spherical aberration represent an e-line and the g-line, respectively. The solid line and the one-dot chain line in astigmatism represent a sagittal image plane ($\Delta S$) and a meridional image plane ($\Delta M$), respectively, and the two-dot chain line in the lateral chromatic aberration represents the g-line. The astigmatism and the lateral chromatic aberration are illustrated as amounts of aberrations when a ray that passes through a center of a light flux at a stop position is assumed to be a principal ray. A paraxial half angle of field is represented by $\omega$, and an F-number is denoted by Fno. In longitudinal aberration diagrams, the spherical aberration, the astigmatism, a distortion, and the lateral chromatic aberration are drawn at scales of 0.5 mm, 0.5 mm, 5%, and 0.05 mm, respectively. Note that, in the following embodiments, the terms "wide angle end" and "telephoto end" refer to zoom positions at times when the second lens unit is located at both ends of a range in which the second lens unit is mechanically movable on the optical axis, respectively. The above descriptions on the lens cross-sectional views and the aberration diagrams are the same also in the following embodiments unless otherwise specified.

A first lens unit to a fourth lens unit in Numerical Embodiment 1 as Embodiment 1 are described. The first lens unit U1 in Numerical Embodiment 1 includes the following sub units: the first lens sub unit U11 corresponding to the first lens surface to the eighth lens surface, and the second lens sub unit U12 corresponding to the ninth lens surface to the twelfth lens surface. The first lens sub unit U11 having a positive refractive power includes, in order from the object side to the image side, a positive lens, a negative lens, a positive lens, and a negative lens. The second lens sub unit U12 having a positive refractive power includes two positive lenses, and the second lens sub unit is moved in the optical axis direction to perform the focus adjustment. The second lens unit U2 in Numerical Embodiment 1 corresponds to the thirteenth lens surface to the twenty-first lens surface, and includes, in order from the object side to the image side, a negative lens, a positive cemented lens formed by cementing a negative lens and a positive lens, a negative lens, and a positive lens. The third lens unit U3 in Numerical Embodiment 1 corresponds to the twenty-second lens surface to the twenty-fourth lens surface, and includes a negative cemented lens formed by cementing a negative lens and a positive lens in order from the object side to the image side. The fourth lens unit U4 in Numerical Embodiment 1 includes the following sub units: a first lens sub unit U41 corresponding to the twenty-fifth lens surface to the twenty-eighth lens surface, and a second lens sub unit U42 corresponding to the thirtieth lens surface to the forty-fifth lens surface. The first lens sub unit U41 includes two lenses. The second lens sub unit U42 includes, in order from the object side, a negative cemented lens, a positive lens, a negative cemented lens, a positive lens, a positive cemented lens, and a negative cemented lens. Aspherical surfaces are used for the thirteenth surface and the twenty-sixth surface. The aspherical surface as the thirteenth surface corrects a variation in curvature of field due to zooming and the variation in spherical aberration on the telephoto side. The aspherical surface as the twenty-sixth surface suppresses the variation in spherical aberration on the wide angle side due to zooming and a variation in coma due to the angle of field.

Values corresponding to the conditional expressions in this embodiment are shown in Table 1. In this numerical embodiment, all of the conditional expressions are satisfied to attain the good optical performance. In addition, the zoom lens has a focal length at the wide angle end of 50 mm, a zoom ratio of 18×, Fno at the wide angle end of 4.5, and Fno at the telephoto end of 7.0 to be usable in the super telephoto range and have the high magnification and the large aperture ratio, and has a maximum image height, which is determined by a product of the focal length and the half angle of field, of 15.7 mm to attain the downsizing despite being compatible with the large format sensor.

Embodiment 2

A first lens unit to a fourth lens unit in Numerical Embodiment 2 as Embodiment 2 of the zoom lens according to the present invention are described.

Figure 4B:
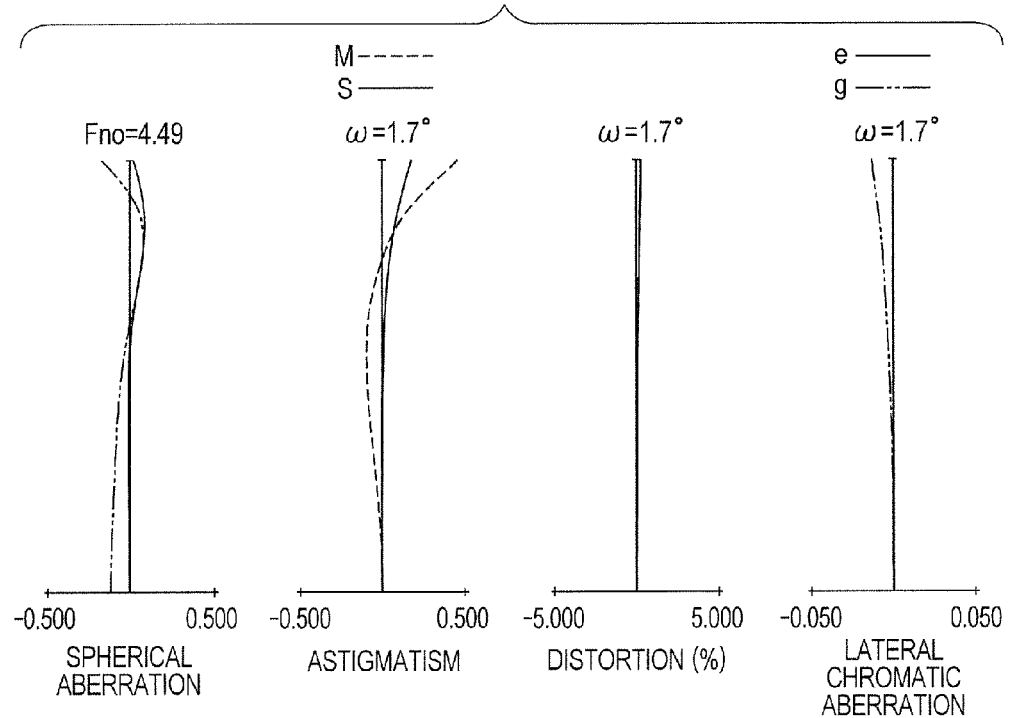
FIG. 4B is a longitudinal aberration diagram in the state in which focus is at infinity at a focal length of 500 mm in the zoom lens according to Embodiment 2.
Figure 4C:
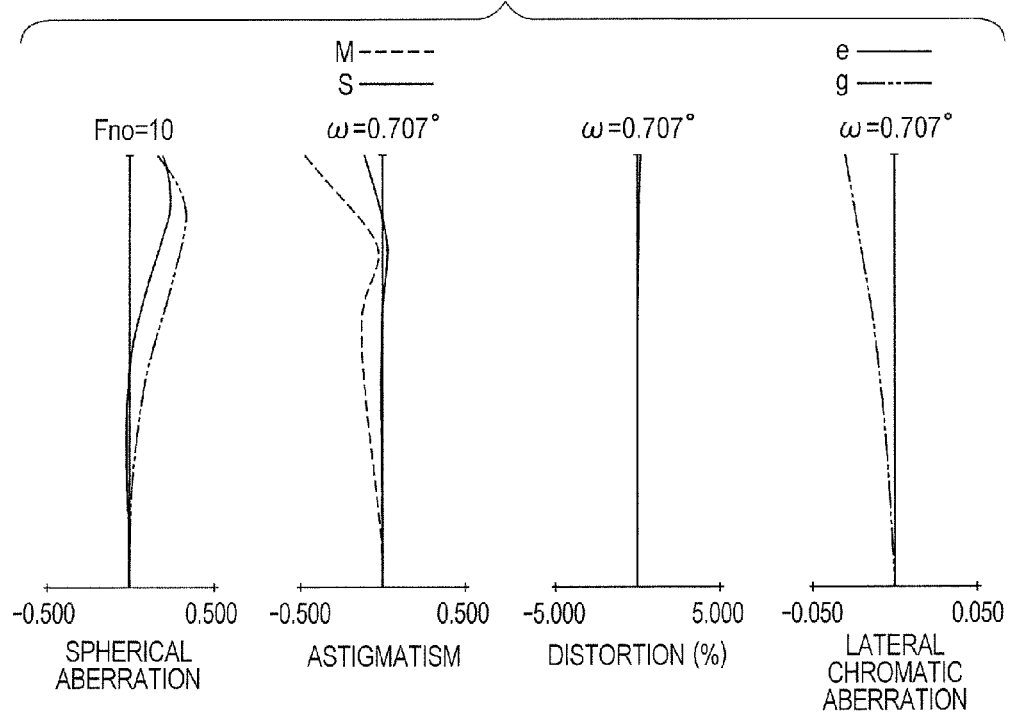
FIG. 4C is a longitudinal aberration diagram in the state in which focus is at infinity at a telephoto end in the zoom lens according to Embodiment 2.

FIG. 3 is a lens cross-sectional view in the state in which focus is at infinity at the wide angle end in the zoom lens according to Embodiment 2. FIG. 4A, FIG. 4B, and FIG. 4C are longitudinal aberration diagrams in the state in which focus is at infinity at the wide angle end, a focal length of 500 mm, and the telephoto end in the zoom lens according to Embodiment 2, respectively.

The first lens unit U1 in Numerical Embodiment 2 includes the following sub units: a first lens sub unit U11 corresponding to the first lens surface to the eighth lens surface, and a second lens sub unit U12 corresponding to the ninth lens surface to the twelfth lens surface. The first lens sub unit U11 having a positive refractive power includes, in order from the object side to the image side, a positive lens, a negative lens, a positive lens, and a negative lens. The second lens sub unit U12 having a positive refractive power includes two positive lenses, and the second lens sub unit is moved in the optical axis direction to perform the focus adjustment. The second lens unit U2 in Numerical Embodiment 2 corresponds to the thirteenth lens surface to the nineteenth lens surface, and includes, in order from the object side to the image side, a negative lens, a positive cemented lens formed by cementing a negative lens and a positive lens, and a negative lens. The third lens unit U3 in Numerical Embodiment 2 corresponds to the twentieth lens surface to the twenty-second lens surface, and includes a negative cemented lens formed by cementing a negative lens and a positive lens in order from the object side to the image side. The fourth lens unit U4 in Numerical Embodiment 2 includes the following sub units: a first lens sub unit U41 corresponding to the twenty-third lens surface to the twenty-ninth lens surface, and a second lens sub unit U42 corresponding to the thirty-first lens surface to the forty-second lens surface. The first lens sub unit U41 includes, in order from the object side, two positive lenses, and a negative cemented lens formed by cementing a positive lens and a negative lens. The second lens sub unit U42 includes, in order from the object side, a positive lens, a negative cemented lens, a negative lens, a negative cemented lens, and a positive lens. Aspherical surfaces are used for the thirteenth surface and the twenty-fourth surface. The aspherical surface as the thirteenth surface corrects the variation in curvature of field due to zooming and the variation in spherical aberration at the telephoto side. The aspherical surface as the twenty-fourth surface suppresses the variation in spherical aberration at the wide angle side due to zooming and the variation in coma due to the angle of field.

Values corresponding to the conditional expressions in this embodiment are shown in Table 1. In this numerical embodiment, all of the conditional expressions are satisfied to attain the good optical performance. In addition, the zoom lens has a focal length at the wide angle end of 50 mm, a zoom ratio of 24×, Fno at the wide angle end of 4.5, and Fno at the telephoto end of 10.0 to be usable in the super telephoto range and have the high magnification and the large aperture ratio, and has a maximum image height of 14.8 mm to attain the downsizing despite being compatible with the large format sensor.

Embodiment 3

A first lens unit to a fourth lens unit in Numerical Embodiment 3 as Embodiment 3 of the zoom lens according to the present invention are described.

Figure 6B:
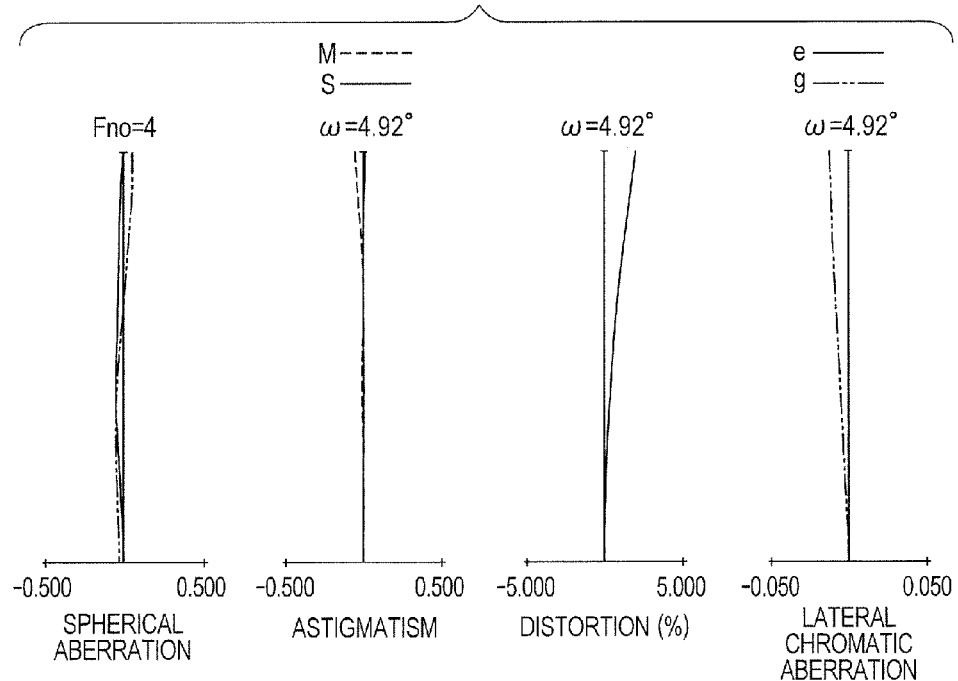
FIG. 6B is a longitudinal aberration diagram in the state in which focus is at infinity at a focal length of 180 mm in the zoom lens according to Embodiment 3.
Figure 6C:
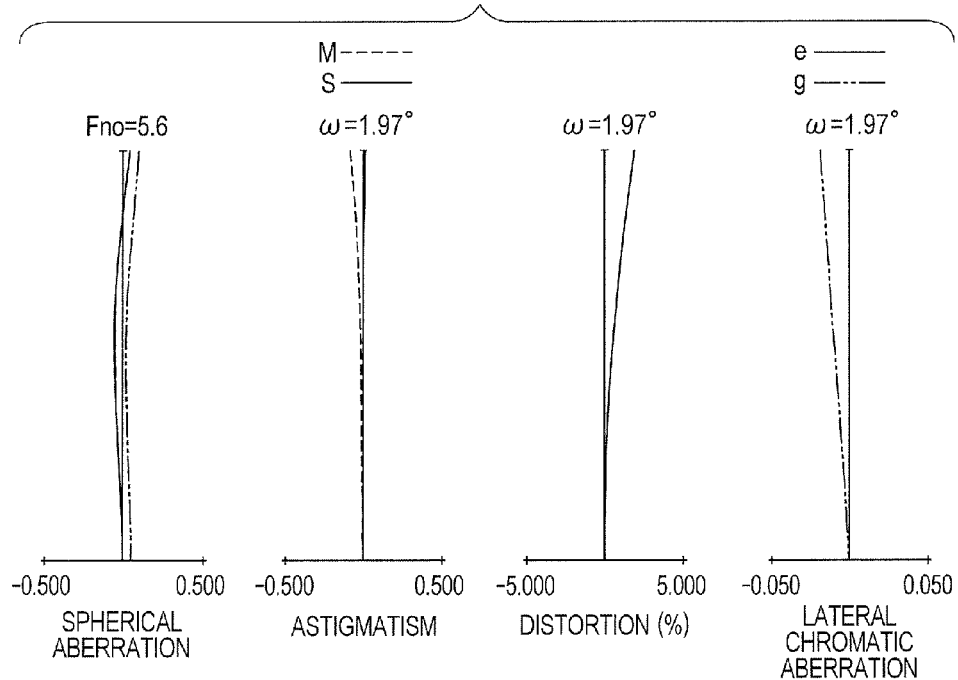
FIG. 6C is a longitudinal aberration diagram in the state in which focus is at infinity at a telephoto end in the zoom lens according to Embodiment 3.

FIG. 5 is a lens cross-sectional view in the state in which focus is at infinity at the wide angle end in the zoom lens according to Embodiment 3. FIG. 6A, FIG. 6B, and FIG. 6C are longitudinal aberration diagrams in the state in which focus is at infinity at the wide angle end, a focal length of 180 mm, and the telephoto end in the zoom lens according to Embodiment 3, respectively.

The first lens unit U1 in Numerical Embodiment 3 includes the following sub units: a first lens sub unit U11 corresponding to the first lens surface to the seventh lens surface, and a second lens sub unit U12 corresponding to the eighth lens surface to the eleventh lens surface. The first lens sub unit U11 having a positive refractive power includes, in order from the object side to the image side, a positive lens, a positive cemented lens formed by cementing a negative lens and a positive lens, and a negative lens. The second lens sub unit U12 having a positive refractive power includes two positive lenses, and the second lens sub unit is moved in the optical axis direction to perform the focus adjustment. The second lens unit U2 in Numerical Embodiment 3 corresponds to the twelfth lens surface to the twentieth lens surface, and includes, in order from the object side to the image side, a negative lens, a positive cemented lens formed by cementing a negative lens and a positive lens, a negative lens, and a positive lens. The third lens unit U3 in Numerical Embodiment 3 corresponds to the twenty-first lens surface to the twenty-third lens surface, and includes a negative cemented lens formed by cementing a negative lens and a positive lens in order from the object side to the image side. The fourth lens unit U4 in Numerical Embodiment 3 corresponds to the twenty-fifth lens surface to the forty-third lens surface. The fourth lens unit U4 includes, in order from the object side to the image side, a positive lens, a positive cemented lens, a positive lens, two negative cemented lenses, a positive lens, a negative lens, and a positive lens. Aspherical surfaces are used for the twelfth surface and the twenty-sixth surface. The aspherical surface as the twelfth lens surface corrects the variation in curvature of field due to zooming and the variation in spherical aberration at the telephoto side. The aspherical surface as the twenty-sixth surface suppresses the variation in spherical aberration at the wide angle side due to zooming and the variation in coma due to the angle of field.

Values corresponding to the conditional expressions in this embodiment are shown in Table 1. In this numerical embodiment, all of the conditional expressions are satisfied to attain the good optical performance. In addition, the zoom lens has a focal length at the wide angle end of 45 mm, a zoom ratio of 10×, Fno at the wide angle end of 4.0, and Fno at the telephoto end of 5.6 to be usable in the super telephoto range and have the high magnification and the large aperture ratio, and has a maximum image height of 15.5 mm to attain the downsizing despite being compatible with the large format sensor.

Embodiment 4

A first lens unit to a fifth lens unit in Numerical Embodiment 4 as Embodiment 4 of the zoom lens according to the present invention are described.

Figure 7:
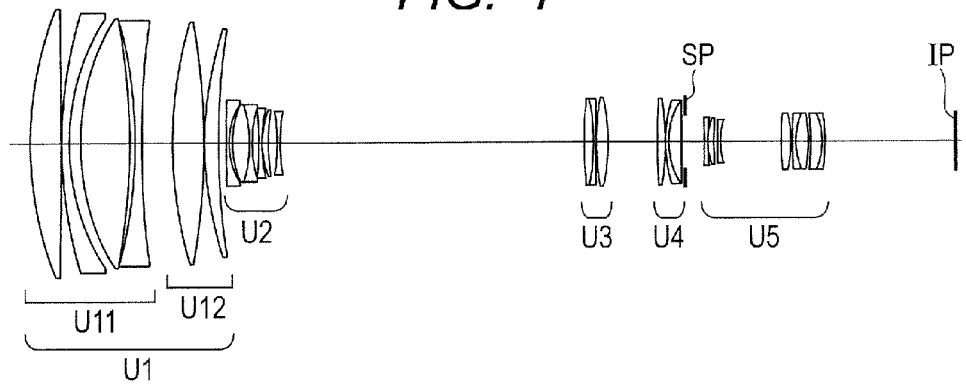
FIG. 7 is a lens cross-sectional view in a state in which focus is at infinity at a wide angle end in a zoom lens according to Embodiment 4.
Figure 8A:
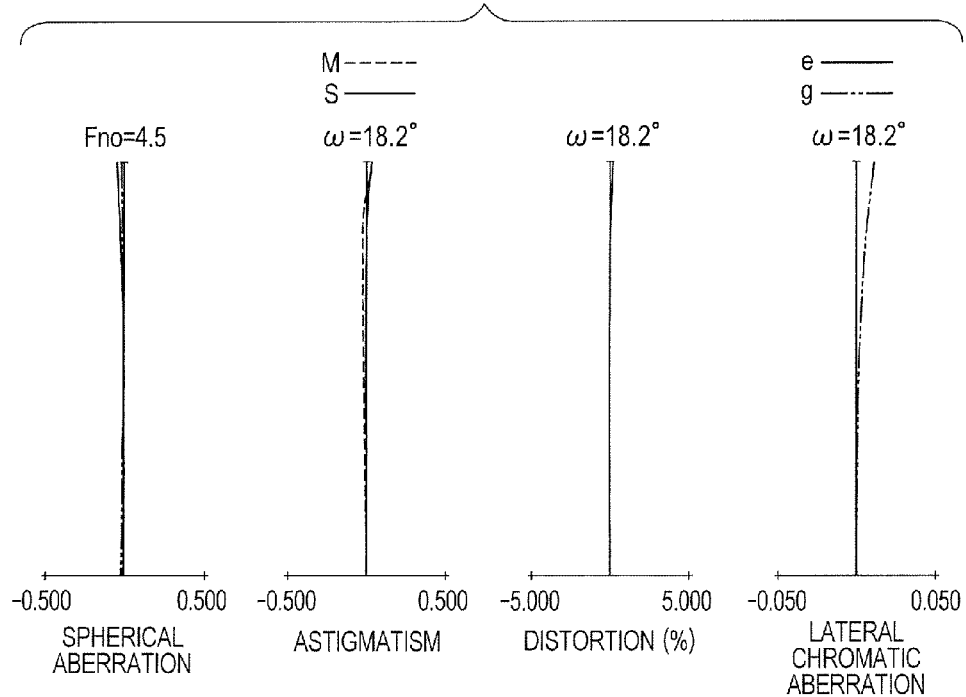
FIG. 8A is a longitudinal aberration diagram in the state in which focus is at infinity at the wide angle end in the zoom lens according to Embodiment 4.
Figure 8B:
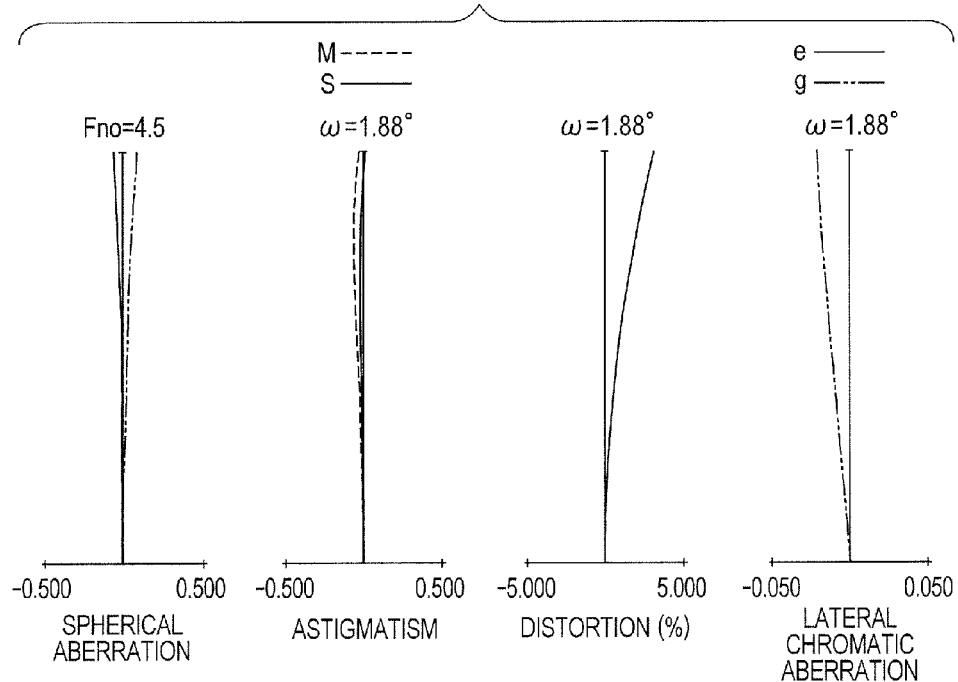
FIG. 8B is a longitudinal aberration diagram in the state in which focus is at infinity at a focal length of 450 mm in the zoom lens according to Embodiment 4.
Figure 8C:
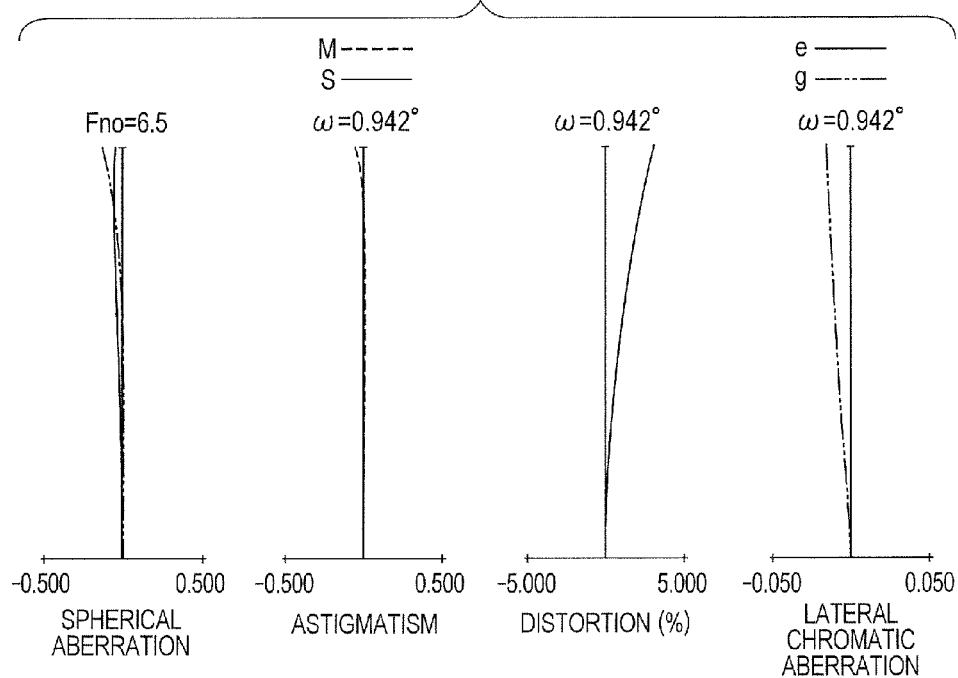
FIG. 8C is a longitudinal aberration diagram in the state in which focus is at infinity at a telephoto end in the zoom lens according to Embodiment 4.

FIG. 7 is a lens cross-sectional view in the state in which focus is at infinity at the wide angle end in the zoom lens according to Embodiment 4. FIG. 8A, FIG. 8B, and FIG. 8C are longitudinal aberration diagrams in the state in which focus is at infinity at the wide angle end, a focal length of 450 mm, and the telephoto end in the zoom lens according to Embodiment 4, respectively.

The first lens unit U1 in Numerical Embodiment 4 includes the following sub units: a first lens sub unit U11 corresponding to the first lens surface to the eighth lens surface, and a second lens sub unit U12 corresponding to the ninth lens surface to the twelfth lens surface. The first lens sub unit U11 having a positive refractive power includes, in order from the object side, a positive lens, a negative lens, a positive lens, and a negative lens. The second lens sub unit U12 having a positive refractive power includes two positive lenses, and the second lens sub unit U12 is moved in the optical axis direction having an optical refractive power to perform the focus adjustment. The second lens unit U2 in Numerical Embodiment 4 corresponds to the thirteenth lens surface to the twenty-third lens surface, and includes, in order from the object side to the image side, a negative lens, a positive cemented lens formed by cementing a positive lens and a negative lens, a negative lens, a positive lens, and a negative lens. The third lens unit U3 in Numerical Embodiment 4 corresponds to the twenty-fourth lens surface to the twenty-eighth lens surface, and includes a positive cemented lens formed by cementing a positive lens and a negative lens in order from the object side to the image side. The fourth lens unit U4 in Numerical Embodiment 4 corresponds to the twenty-ninth lens surface to the thirty-third lens surface, and includes, in order from the object side, a positive lens and a positive cemented lens formed by cementing a negative lens and a positive lens. The fifth lens unit U5 in Numerical Embodiment 4 corresponds to the thirty-fifth lens surface to the forty-eighth lens surface, and includes, in order from the object side to the image side, a negative lens, a positive lens, a negative lens, a positive lens, a positive cemented lens, and a negative cemented lens. An asphericai surface is used for the twenty-sixth surface, and suppresses the variation in spherical aberration at the wide angle side due to zooming and the variation in coma due to the angle of field.

Values corresponding to the conditional expressions in this embodiment are shown in Table 1. In this numerical embodiment, all of the conditional expressions are satisfied to attain the good optical performance. In addition, the zoom lens has a focal length at the wide angle end of 45 mm, a zoom ratio of 20×, Fno at the wide angle end of 4.5, and Fno at the telephoto end of 6.5 to be usable in the super telephoto range and have the high magnification and the large aperture ratio, and has a maximum image height of 14.8 mm to attain the downsizing despite being compatible with the large format sensor.

Embodiment 5

A first lens unit to a fourth lens unit in Numerical Embodiment 5 as Embodiment 5 of the zoom lens according to the present invention are described.

Figure 9:
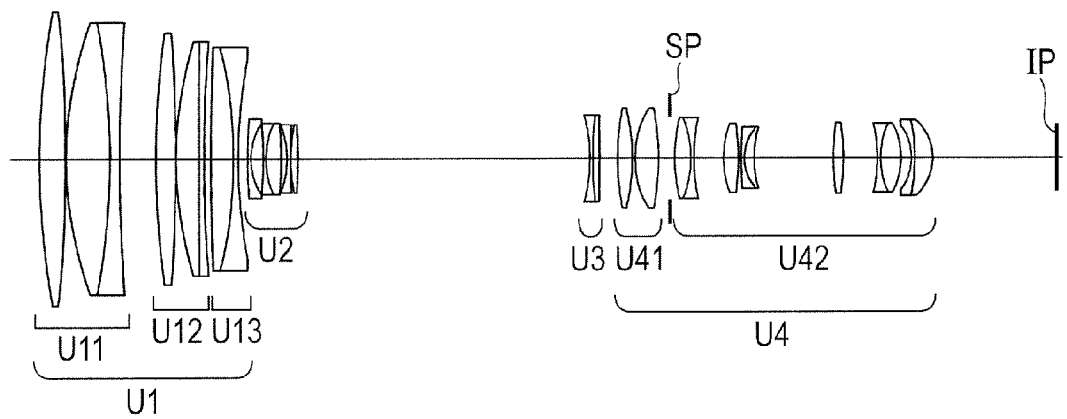
FIG. 9 is a lens cross-sectional view in a state in which focus is at infinity at a wide angle end in a zoom lens according to Embodiment 5.
Figure 10A:
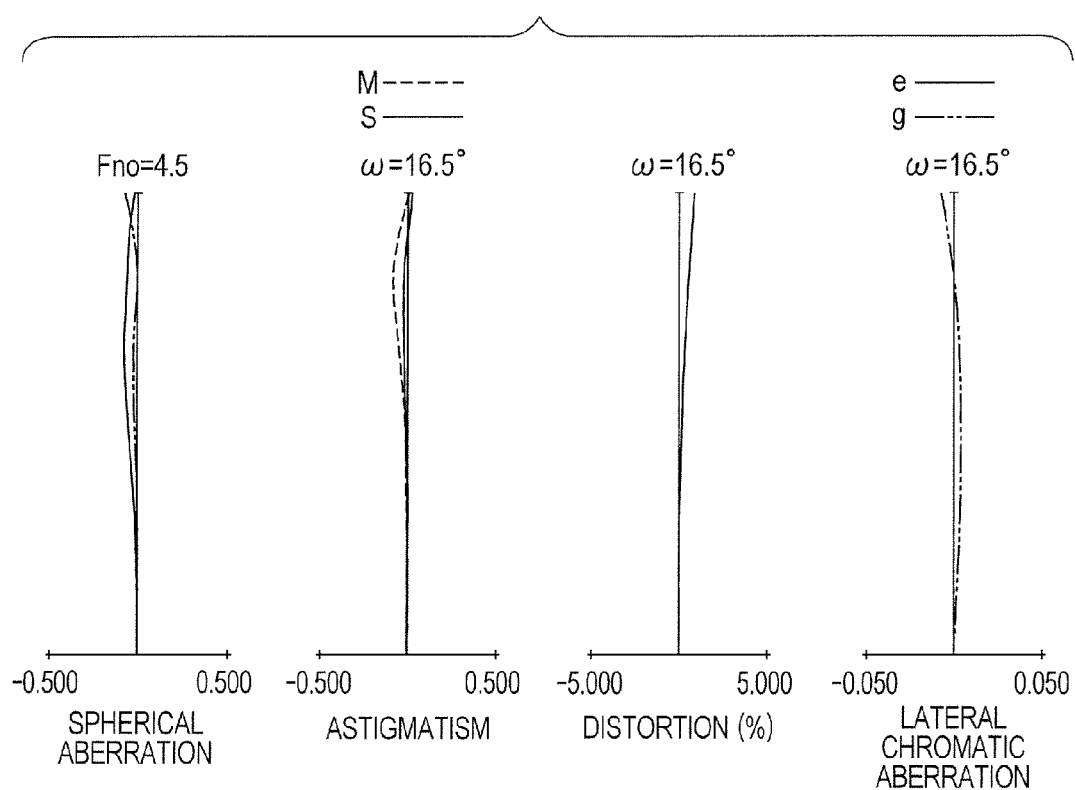
FIG. 10A is a longitudinal aberration diagram in the state in which focus is at infinity at the wide angle end in the zoom lens according to Embodiment 5.
Figure 10B:
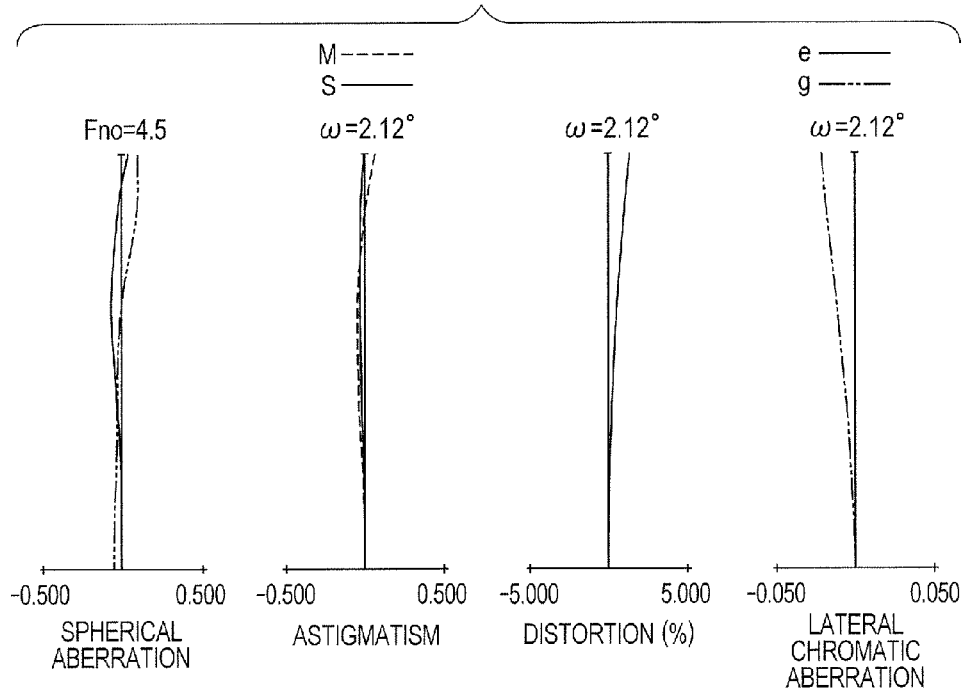
FIG. 10B is a longitudinal aberration diagram in the state in which focus is at infinity at a focal length of 400 mm in the zoom lens according to Embodiment 5.
Figure 10C:
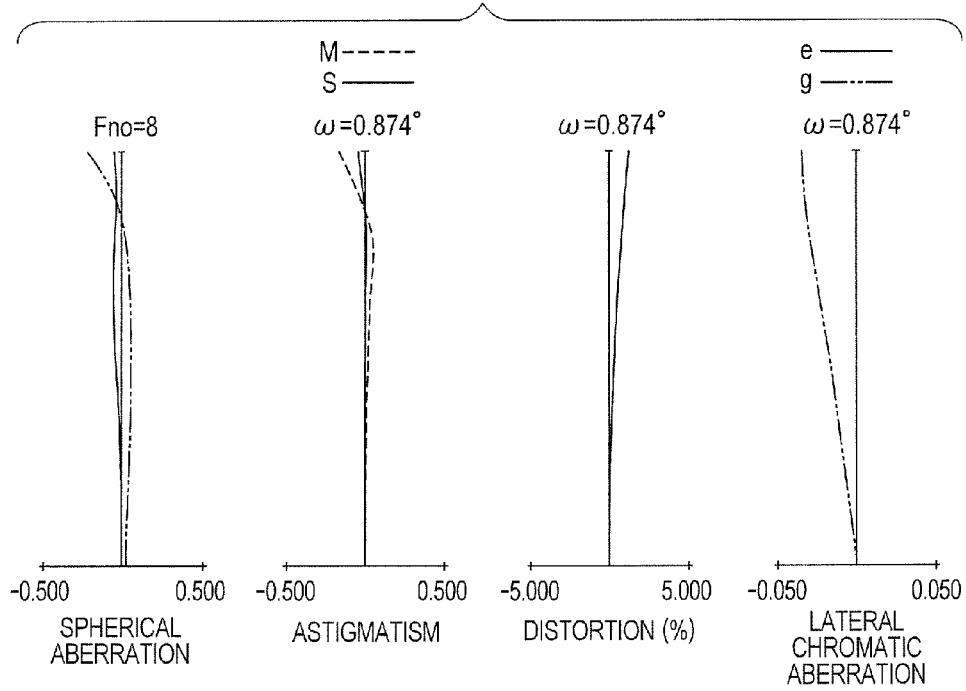
FIG. 10C is a longitudinal aberration diagram in the state in which focus is at infinity at a telephoto end in the zoom lens according to Embodiment 5.

FIG. 9 is a lens cross-sectional view in the state in which focus is at infinity at the wide angle end in the zoom lens according to Embodiment 5. FIG. 10A, FIG. 10B, and FIG. 10C are longitudinal aberration diagrams in the state in which focus is at infinity at the wide angle end, a focal length of 180 mm, and the telephoto end in the zoom lens according to Embodiment 5, respectively.

The first lens unit U1 in Numerical Embodiment 5 includes the following sub units: a first lens sub unit U11 corresponding to the first lens surface to the fifth lens surface, a second lens sub unit U12 corresponding to the sixth lens surface to the tenth lens surface, and a third lens sub unit U13 corresponding to the eleventh lens surface to the thirteenth lens surface. The first lens sub unit U11 having a positive refractive power includes, in order from the object side, a positive lens and a cemented lens formed by cementing a positive lens and a negative lens. The second lens sub unit U12 having a positive refractive power includes a positive lens and a cemented lens formed by cementing a positive lens and a negative lens, and is moved in the optical axis direction (to the object side) to perform the focus adjustment (from infinity to proximity). The third lens sub unit U13 having a negative refractive power includes a cemented lens formed by cementing a positive lens and a negative lens. The second lens unit U2 corresponds to the fourteenth lens surface to the twenty-second lens surface, and includes, in order from the object side, a negative lens, a cemented lens formed by cementing a negative lens and a positive lens, a negative lens, and a positive lens. The third lens unit U3 corresponds to the twenty-third lens surface to the twenty-fifth lens surface, and includes a negative cemented lens formed by cementing a negative lens and a positive lens in order from the object side. The fourth lens unit U4 includes the following sub units: a first lens sub unit U41 corresponding to the twenty-sixth lens surface to the twenty-ninth lens surface, and a second lens sub unit U42 corresponding to the thirty-first lens surface to the forty-sixth lens surface. The first lens sub unit U41 includes two positive lenses in order from the object side to the image side. The second lens sub unit U42 includes a cemented lens formed by cementing a positive lens and a negative lens, a positive lens, a cemented lens formed by cementing a negative lens and a positive lens, a positive lens, a cemented lens formed by cementing a negative lens and a positive lens, and a cemented lens formed by cementing a negative lens and a positive lens. Aspherical surfaces are used for the fourteenth surface and the twenty-seventh surface. The aspherical surface as the fourteenth surface corrects the variation in curvature of field due to zooming and the variation in spherical aberration at the telephoto side. The aspherical surface as the twenty-seventh surface suppresses the variation in spherical aberration at the wide angle side due to zooming and the variation in coma due to the angle of field.

Values corresponding to the conditional expressions in this embodiment are shown in Table 1. In this numerical embodiment, all of the conditional expressions are satisfied to attain the good optical performance. In addition, the zoom lens has a focal length at the wide angle end of 50 mm, a zoom ratio of 19.4×, Fno at the wide angle end of 4.5, and Fno at the telephoto end of 8.0 to be usable in the super telephoto range and have the high magnification, the large aperture ratio, and a small size and weight.

(Image Pickup Apparatus)

Figure 11:
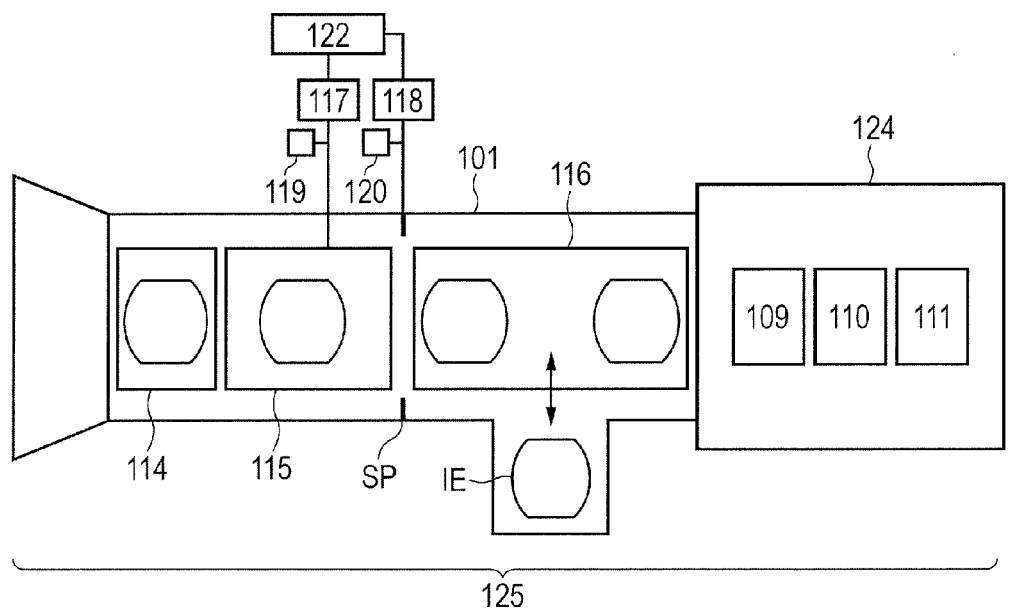
FIG. 11 is a schematic diagram of a main part of an image pickup apparatus according to the present invention.

Next, an image pickup apparatus using each zoom lens described above as an image pickup optical system is described. FIG. 11 is a schematic diagram of a main part of an image pickup apparatus (television camera system) using the zoom lens according to each embodiment as an image pickup optical system. In FIG. 11, a zoom lens 101 is any one of the zoom lenses according to Embodiments 1 to 5.

The zoom lens 101 may be detachably mounted on a camera 124, to thereby construct an image pickup apparatus 125. The zoom lens 101 includes a first lens unit 114, a zoom portion 115 configured to move during zooming, and a lens unit 116 for imaging. Further, the zoom lens 101 includes an aperture stop SP. The lens unit 116 configured to be fixed during the zooming includes a zoom optical system IE, which is retractably insertable in an optical path.

The zoom portion 115 includes a drive mechanism for being driven in the optical axis direction. Drive units 117 and 118 such as motors electrically drive the zoom portion 115 and the aperture stop SP, respectively. Note that, the drive mechanism may be added to move all of the lens units 114, 115, and 116 or a part of each lens unit in the optical axis direction for focusing. Detectors 119 and 120 such as an encoder, a potentiometer, or a photosensor for detecting positions of the lens units in the zoom portion 115 on the optical axis and a stop diameter of the aperture stop SP. Note that, drive loci of the lens units in the zoom portion 115 may be mechanical loci by a helicoid, a cam, or the like, or electric loci by an ultrasonic motor or the like. In addition, the camera body 124 includes a glass block 109, which is equivalent to an optical filter or a color separation prism in the camera body 124. Further, the camera body 124 includes a solid-state image pickup element (photoelectrical transducer 110 configured to photoelectrically convert an optical image, such as a CCD sensor or a CMOS sensor that receives an object image formed by the zoom lens 101. Further, CPUs 111 and 122 control the driving of the camera body 124 and the zoom lens 101, respectively. By applying the zoom lens according to the present invention to a television camera as described above, an image pickup apparatus having high optical performance may be implemented.

The exemplary embodiments of the present invention are described above, but the present invention is not limited to these embodiments and can be modified and changed variously within the scope of the gist thereof.

Next, Numerical Embodiments 1 to 5 corresponding to Embodiments 1 to 5 of the present invention are shown below. In each of the numerical embodiments, symbol "i" represents the order of a surface from the object side, symbol "ri" represents a radius of curvature of an i-th surface from the object side, symbol "di" represents an interval between the i-th surface and an (i+1)th surface from the object side, and symbols "ndi", "vdi", and "θgfi" respectively represent a refractive index, an Abbe constant, and a relative partial dispersion of an optical material between the i-th surface and the (i+1)th surface. The focal length, the F-number, and the angle of field represent values when focus is at infinity. Symbol BF is an air conversion value of a distance from the final surface of the lens to the image plane.

Note that, the aspherical shape is expressed by the following expression:

$$x = (y^2/R)/\{1+(1-k \times y^2/R^2)^{0.5}\} + A4 \times y^4 + A6 \times y^6 + A8 \times y^8 + A10 \times y^{10} + A12 \times y^{12}$$

where x represents a coordinate in the optical axis direction, y represents a coordinate in a direction perpendicular to the optical axis, R represents a standard radius of curvature, k represents a conic constant, and An represents an n-th order aspherical coefficient, provided that "e-x" means "$\times 10^{-x}$". Note that, the lens surfaces having the aspherical surfaces are marked with asterisks (*) on the left side of surface numbers in the tables.

The correspondence between each of the embodiments and each of the above-mentioned conditional expressions is shown in Table 1.

(Numerical Embodiment 1)
Unit mm

Surface data

| Surface number | r | d | nd | vd | θgF | Effective diameter | Focal length |
|---|---|---|---|---|---|---|---|
| 1 | 164.54198 | 17.02128 | 1.487490 | 70.23 | 0.5300 | 128.571 | 313.627 |
| 2 | −2190.49132 | 1.00000 | 1.000000 | | | 127.748 | |
| 3 | 163.40559 | 3.40000 | 1.729157 | 54.68 | 0.5444 | 121.685 | −413.894 |
| 4 | 105.23588 | 5.74496 | 1.000000 | | | 116.266 | |
| 5 | 118.29851 | 22.47999 | 1.433870 | 95.10 | 0.5373 | 115.912 | 211.723 |
| 6 | −391.74363 | 1.50000 | 1.000000 | | | 114.674 | |
| 7 | −311.03637 | 3.20000 | 1.729157 | 54.68 | 0.5444 | 114.361 | −162.188 |
| 8 | 192.99022 | 17.06673 | 1.000000 | | | 110.421 | |
| 9 | 154.70242 | 17.13122 | 1.433870 | 95.10 | 0.5373 | 110.824 | 258.715 |
| 10 | −398.94815 | 0.20000 | 1.000000 | | | 110.169 | |
| 11 | 138.85079 | 7.13187 | 1.433870 | 95.10 | 0.5373 | 103.924 | 788.934 |
| 12 | 229.58667 | (Variable) | 1.000000 | | | 102.373 | |
| 13* | 10889.24382 | 1.20000 | 1.772499 | 49.60 | 0.5521 | 31.612 | −38.571 |
| 14 | 29.85572 | 5.86578 | 1.000000 | | | 28.819 | |
| 15 | −158.06465 | 1.00000 | 1.618000 | 63.33 | 0.5441 | 28.491 | −42.804 |
| 16 | 31.99078 | 7.27954 | 1.720467 | 34.70 | 0.5834 | 28.180 | 31.994 |
| 17 | −76.45010 | 3.05713 | 1.000000 | | | 28.164 | |
| 18 | −36.03783 | 1.00000 | 1.618000 | 63.33 | 0.5441 | 28.039 | −53.837 |
| 19 | 460.54582 | 0.20000 | 1.000000 | | | 29.129 | |
| 20 | 77.61472 | 2.84519 | 1.548141 | 45.79 | 0.5685 | 29.814 | 153.760 |
| 21 | 913.44529 | (Variable) | 1.000000 | | | 30.057 | |
| 22 | −74.28603 | 1.00000 | 1.729157 | 54.68 | 0.5444 | 38.265 | −70.334 |
| 23 | 168.94128 | 3.37550 | 1.846660 | 23.78 | 0.6205 | 39.859 | 174.819 |
| 24 | −1285.45589 | (Variable) | 1.000000 | | | 40.470 | |
| 25 | 78.88308 | 8.43195 | 1.593490 | 67.00 | 0.5361 | 45.059 | 66.808 |
| 26* | −77.09230 | 1.00000 | 1.000000 | | | 45.248 | |
| 27 | 50.04199 | 8.78266 | 1.595220 | 67.74 | 0.5442 | 43.822 | 62.753 |
| 28 | −139.55383 | 3.00000 | 1.000000 | | | 42.888 | |
| 29 | 0.00000 | 3.00000 | 1.000000 | | | 38.132 | |
| 30 | −139.46830 | 4.62298 | 1.438750 | 94.93 | 0.5343 | 36.278 | 149.353 |
| 31 | −45.11036 | 1.20000 | 2.003300 | 28.27 | 0.5980 | 34.999 | −30.099 |
| 32 | 94.96028 | 3.46019 | 1.000000 | | | 34.196 | |
| 33 | 43.24218 | 9.03822 | 1.567322 | 42.80 | 0.5730 | 34.827 | 46.936 |
| 34 | −64.97317 | 4.21679 | 1.000000 | | | 34.071 | |
| 35 | −367.83887 | 1.20000 | 2.001000 | 29.13 | 0.5997 | 29.285 | −18.300 |
| 36 | 19.47519 | 8.01664 | 1.846660 | 23.78 | 0.6205 | 27.053 | 24.679 |
| 37 | 204.74268 | 43.19216 | 1.000000 | | | 26.456 | |
| 38 | 47.06859 | 3.59028 | 1.487490 | 70.23 | 0.5300 | 21.605 | 76.226 |
| 39 | −174.89753 | 7.38514 | 1.000000 | | | 21.379 | |
| 40 | −29.97651 | 1.00000 | 1.882997 | 40.76 | 0.5667 | 20.006 | −15.430 |
| 41 | 25.64141 | 7.28780 | 1.717362 | 29.50 | 0.6048 | 21.063 | 17.553 |
| 42 | −22.13650 | 2.00000 | 1.000000 | | | 21.773 | |
| 43 | −17.57471 | 1.00000 | 1.953750 | 32.32 | 0.5898 | 21.482 | −26.173 |
| 44 | −60.00000 | 8.53547 | 1.517417 | 52.43 | 0.5564 | 23.577 | 48.526 |
| 45 | −18.62134 | BF | 1.000000 | | | 26.369 | |
| Image plane | ∞ | | | | | | |

-continued (Numerical Embodiment 1)
Unit mm

Aspherical surface data

Thirteenth surface

K = 9.77458e+004    A4 = 2.20189e−006    A6 = 2.88707e−011    A8 = 2.09078e−012
A10 = −1.14265e−013   A12 = 9.17677e−016   A14 = −3.08089e−018   A16 = 3.85985e−021

Twenty-sixth surface

K = −9.05930e−001   A4 = 7.04555e−007    A6 = 2.55835e−010    A8 = −9.15718e−013
A10 = 2.78952e−015   A12 = −2.67183e−018   A14 = −1.00580e−021   A16 = 2.50307e−024

Various data
Zoom ratio 18.00

|  | Wide angle | Intermediate | Telephoto |
|---|---|---|---|
| Focal length | 50.00 | 400.00 | 900.00 |
| F-number | 4.50 | 4.50 | 7.00 |
| Angle of field | 17.59 | 2.27 | 1.01 |
| Image height | 15.85 | 15.85 | 15.85 |
| Total lens length | 450.92 | 450.92 | 450.92 |
| BF | 45.92 | 45.92 | 45.92 |
| d12 | 10.00 | 120.50 | 137.50 |
| d21 | 137.35 | 7.78 | 13.34 |
| d24 | 4.99 | 24.06 | 1.50 |
| d45 | 45.92 | 45.92 | 45.92 |
| Incident pupil position | 173.69 | 1202.69 | 2262.98 |
| Exit pupil position | −118.20 | −118.20 | −118.20 |
| Front principal point position | 208.46 | 627.79 | −1772.42 |
| Rear principal point position | −4.08 | −354.08 | −854.08 |

Zoom lens unit data

| Unit | First surface | Focal length | Lens structure length | Front principal point position | Rear principal point position |
|---|---|---|---|---|---|
| 1 | 1 | 225.00 | 95.88 | 36.28 | −45.00 |
| 2 | 13 | −33.00 | 22.45 | 2.61 | −13.60 |
| 3 | 22 | −118.37 | 4.38 | −0.24 | −2.64 |
| 4 | 25 | 53.57 | 129.96 | −4.67 | −134.68 |

(Numerical Embodiment 2)
Unit mm

Surface data

| Surface number | r | d | nd | vd | θgF | Effective diameter | Focal length |
|---|---|---|---|---|---|---|---|
| 1 | 163.52796 | 17.52677 | 1.496999 | 81.54 | 0.5374 | 121.931 | 265.856 |
| 2 | −673.88220 | 1.00000 | 1.000000 |  |  | 120.523 |  |
| 3 | 135.03738 | 3.70000 | 1.772499 | 49.60 | 0.5521 | 111.442 | −528.006 |
| 4 | 100.35493 | 4.58990 | 1.000000 |  |  | 106.756 |  |
| 5 | 108.78616 | 16.31248 | 1.433870 | 95.10 | 0.5373 | 105.998 | 261.508 |
| 6 | 2381.64315 | 4.34869 | 1.000000 |  |  | 104.445 |  |
| 7 | −382.04680 | 3.20000 | 1.772499 | 49.60 | 0.5521 | 104.301 | −159.307 |
| 8 | 183.50128 | 13.20363 | 1.000000 |  |  | 100.762 |  |
| 9 | 157.15620 | 10.85868 | 1.496999 | 81.54 | 0.5374 | 100.533 | 311.348 |
| 10 | −12135.28995 | 0.20000 | 1.000000 |  |  | 99.953 |  |
| 11 | 252.22314 | 7.96434 | 1.496999 | 81.54 | 0.5374 | 98.133 | 445.272 |
| 12 | −1829.62885 | (Variable) | 1.000000 |  |  | 97.210 |  |
| 13* | −476.80680 | 1.20000 | 1.729157 | 54.68 | 0.5444 | 38.718 | −42.539 |
| 14 | 33.36583 | 4.07612 | 1.000000 |  |  | 34.750 |  |
| 15 | 163.34864 | 1.00000 | 1.618000 | 63.33 | 0.5441 | 34.716 | −47.723 |
| 16 | 25.00305 | 10.15149 | 1.720467 | 34.70 | 0.5834 | 33.071 | 30.091 |
| 17 | −142.53929 | 5.31348 | 1.000000 |  |  | 32.043 |  |
| 18 | −34.77696 | 1.00000 | 1.696797 | 55.53 | 0.5433 | 29.670 | −57.145 |

-continued (Numerical Embodiment 2)
Unit mm

| | | | | | | | |
|---|---|---|---|---|---|---|---|
| 19 | −269.96392 | (Variable) | 1.000000 | | | 29.605 | |
| 20 | −70.40750 | 1.00000 | 1.729157 | 54.68 | 0.5444 | 31.238 | −64.049 |
| 21 | 141.35971 | 2.95353 | 1.846660 | 23.78 | 0.6205 | 32.349 | 161.138 |
| 22 | −5387.41703 | (Variable) | 1.000000 | | | 32.879 | |
| 23 | 608.61658 | 3.67957 | 1.516330 | 64.14 | 0.5352 | 49.349 | 306.160 |
| 24* | −214.17660 | 0.20000 | 1.000000 | | | 49.934 | |
| 25 | 61.90583 | 11.98059 | 1.496999 | 81.54 | 0.5374 | 52.669 | 74.263 |
| 26 | −86.14368 | 0.49956 | 1.000000 | | | 52.517 | |
| 27 | 92.72322 | 10.44842 | 1.438750 | 94.93 | 0.5343 | 48.892 | 92.175 |
| 28 | −69.56630 | 1.50000 | 2.001000 | 29.13 | 0.5997 | 47.433 | −47.854 |
| 29 | 159.60176 | 5.05908 | 1.000000 | | | 46.549 | |
| 30 | 0.00000 | 2.00000 | 1.000000 | | | 46.736 | |
| 31 | 61.25142 | 8.18905 | 1.688931 | 31.07 | 0.6003 | 47.112 | 67.089 |
| 32 | −183.67019 | 19.20874 | 1.000000 | | | 46.507 | |
| 33 | −64.34334 | 1.20000 | 2.001000 | 29.13 | 0.5997 | 32.742 | −24.825 |
| 34 | 41.40723 | 7.29247 | 1.761821 | 26.52 | 0.6135 | 32.308 | 34.151 |
| 35 | −66.20876 | 53.12461 | 1.000000 | | | 32.389 | |
| 36 | −50.54071 | 1.50000 | 2.001000 | 29.13 | 0.5997 | 20.337 | −75.398 |
| 37 | −152.77839 | 8.68424 | 1.000000 | | | 20.793 | |
| 38 | 87.15253 | 5.67633 | 1.761821 | 26.52 | 0.6135 | 23.578 | 26.448 |
| 39 | −25.76129 | 1.00000 | 2.001000 | 29.13 | 0.5997 | 23.654 | −20.499 |
| 40 | 107.04594 | 1.41893 | 1.000000 | | | 24.363 | |
| 41 | 64.34057 | 4.19455 | 1.672700 | 32.10 | 0.5988 | 25.505 | 56.285 |
| 42 | −91.20360 | BF | 1.000000 | | | 25.818 | |
| Image plane | ∞ | | | | | | |

Aspherical surface data

Thirteenth surface

K = 0.00000e+000   A4 = 3.52166e−006   A6 = −9.04425e−010
A8 = −4.02105e−014   A10 = 2.11684e−015   A12 = −4.10826e−019

Twenty-fourth surface

K = −8.40684e−001   A4 = 5.82961e−007   A6 = 1.12421e−010
A8 = 2.39096e−013   A10 = −2.88892e−016   A12 = 2.42509e−019

Various data
Zoom ratio 24.00

| | Wide angle | Intermediate | Telephoto |
|---|---|---|---|
| Focal length | 50.00 | 500.00 | 1200.00 |
| F-number | 4.50 | 4.49 | 10.00 |
| Angle of field | 16.49 | 1.70 | 0.71 |
| Image height | 14.80 | 14.80 | 14.80 |
| Total lens length | 465.00 | 465.00 | 465.00 |
| BF | 55.00 | 55.00 | 55.00 |
| d12 | 6.31 | 109.89 | 122.42 |
| d19 | 114.62 | 3.35 | 28.63 |
| d22 | 32.62 | 40.31 | 2.50 |
| d42 | 55.00 | 55.00 | 55.00 |
| Incident pupil position | 168.58 | 1476.41 | 3303.63 |
| Exit pupil position | −101.85 | −101.85 | −101.85 |
| Front principal point position | 202.64 | 382.51 | −4677.24 |
| Rear principal point position | 5.00 | −445.00 | −1145.00 |

Zoom lens unit data

| Unit | First surface | Focal length | Lens structure length | Front principal point position | Rear principal point position |
|---|---|---|---|---|---|
| 1 | 1 | 208.00 | 82.90 | 24.79 | −44.72 |
| 2 | 13 | −33.00 | 22.74 | 6.49 | −8.60 |
| 3 | 20 | −106.77 | 3.95 | −0.09 | −2.26 |
| 4 | 23 | 57.71 | 146.86 | −15.60 | −128.59 |

(Numerical Embodiment 3)
Unit mm

Surface data

| Surface number | r | d | nd | vd | θgF | Effective diameter | Focal length |
|---|---|---|---|---|---|---|---|
| 1 | 218.94302 | 6.65813 | 1.516330 | 64.14 | 0.5352 | 93.000 | 529.651 |
| 2 | 1070.66547 | 0.50206 | 1.000000 | | | 92.017 | |
| 3 | 161.02005 | 3.23908 | 1.772499 | 49.60 | 0.5521 | 88.980 | −256.862 |
| 4 | 88.29585 | 16.31030 | 1.433870 | 95.10 | 0.5373 | 84.717 | 160.333 |
| 5 | −313.23472 | 1.00000 | 1.000000 | | | 83.571 | |
| 6 | −243.00079 | 2.59126 | 1.772499 | 49.60 | 0.5521 | 83.421 | −240.887 |
| 7 | 814.81381 | 18.09624 | 1.000000 | | | 81.637 | |
| 8 | 145.63900 | 9.17696 | 1.433870 | 95.10 | 0.5373 | 75.541 | 241.718 |
| 9 | −370.84555 | 0.12147 | 1.000000 | | | 75.156 | |
| 10 | 208.55454 | 5.69268 | 1.595220 | 67.74 | 0.5442 | 73.381 | 480.783 |
| 11 | 753.97372 | (Variable) | 1.000000 | | | 72.244 | |
| 12* | 187.64079 | 1.20000 | 1.754998 | 52.32 | 0.5476 | 36.767 | −45.763 |
| 13 | 29.20963 | 6.47175 | 1.000000 | | | 32.965 | |
| 14 | −99.41626 | 1.20000 | 1.595220 | 67.74 | 0.5442 | 32.965 | −46.046 |
| 15 | 38.19502 | 7.06175 | 1.720467 | 34.70 | 0.5834 | 32.710 | 39.996 |
| 16 | −111.29401 | 2.02088 | 1.000000 | | | 32.475 | |
| 17 | −44.71072 | 1.20000 | 1.595220 | 67.74 | 0.5442 | 32.404 | −62.827 |
| 18 | 235.92999 | 0.20000 | 1.000000 | | | 32.633 | |
| 19 | 65.38496 | 3.62872 | 1.613397 | 44.30 | 0.5633 | 32.911 | 149.413 |
| 20 | 220.39947 | (Variable) | 1.000000 | | | 32.698 | |
| 21 | −74.85518 | 1.20000 | 1.816000 | 46.62 | 0.5568 | 33.306 | −59.919 |
| 22 | 144.10760 | 3.16986 | 1.846660 | 23.78 | 0.6205 | 34.625 | 126.896 |
| 23 | −434.67238 | (Variable) | 1.000000 | | | 35.172 | |
| 24 | 0.00000 | (Variable) | 1.000000 | | | 37.252 | |
| 25 | 183.30520 | 5.47405 | 1.729157 | 54.68 | 0.5444 | 38.532 | 77.013 |
| 26* | −80.43620 | 0.15000 | 1.000000 | | | 38.956 | |
| 27 | 37.58747 | 8.79605 | 1.438750 | 94.93 | 0.5343 | 39.025 | 70.608 |
| 28 | −165.97844 | 1.20000 | 2.003300 | 28.27 | 0.5980 | 38.240 | −94.218 |
| 29 | 224.71940 | 2.00000 | 1.000000 | | | 37.679 | |
| 30 | 36.13538 | 7.12795 | 1.595220 | 67.74 | 0.5442 | 36.482 | 60.561 |
| 31 | 31120.11909 | 12.94012 | 1.000000 | | | 35.298 | |
| 32 | 0.00000 | 0.00000 | 1.000000 | | | 1000.000 | |
| 33 | 0.00000 | 0.00000 | 1.000000 | | | 1000.000 | |
| 34 | −819.60927 | 0.90000 | 1.882997 | 40.76 | 0.5667 | 23.533 | −20.663 |
| 35 | 18.78213 | 6.84827 | 1.496999 | 81.54 | 0.5374 | 21.610 | 27.995 |
| 36 | −47.70406 | 0.88534 | 1.000000 | | | 21.415 | |
| 37 | −59.01640 | 5.74977 | 1.720467 | 34.70 | 0.5834 | 21.210 | 30.706 |
| 38 | −16.83295 | 0.90000 | 1.754998 | 52.32 | 0.5476 | 21.357 | −20.274 |
| 39 | 181.84438 | 1.22273 | 1.000000 | | | 21.760 | |
| 40 | −135.16710 | 2.87717 | 1.720467 | 34.70 | 0.5834 | 21.866 | 96.856 |
| 41 | −46.64245 | 4.61435 | 1.000000 | | | 22.267 | |
| 42 | −23.18456 | 1.50000 | 1.800999 | 34.97 | 0.5863 | 22.258 | −112.449 |
| 43 | −32.04793 | 32.06714 | 1.000000 | | | 23.273 | |
| 44 | 450.56283 | 4.04025 | 1.613397 | 44.30 | 0.5633 | 31.295 | 131.694 |
| 45 | −98.73303 | BF | 1.000000 | | | 31.585 | |
| Image plane | ∞ | | | | | | |

Aspherical surface data

Twelfth surface

K = 3.16458e+001　　A4 = −4.96905e−008　　A6 = −5.97045e−010
A8 = −3.67230e−013　　A10 = 8.65917e−016　　A12 = −1.31114e−018

Twenty-sixth surface

K = −9.86309e−001　　A4 = 4.01809e−007　　A6 = 3.60603e−010
A8 = −1.00121e−012　　A10 = 2.22276e−015　　A12 = −1.58775e−018

Various data
Zoom ratio 10.00

| | Wide angle | Intermediate | Telephoto |
|---|---|---|---|
| Focal length | 45.00 | 180.00 | 450.00 |
| F-number | 4.00 | 4.00 | 5.60 |
| Angle of field | 19.01 | 4.92 | 1.97 |
| Image height | 15.50 | 15.50 | 15.50 |
| Total lens length | 346.76 | 346.76 | 346.76 |
| BF | 50.01 | 50.01 | 50.01 |
| d11 | 1.00 | 73.58 | 98.23 |
| d20 | 100.53 | 13.54 | 5.44 |
| d23 | 3.70 | 18.10 | 1.57 |

-continued (Numerical Embodiment 3)
Unit mm

| | | | |
|---|---|---|---|
| d24 | 1.48 | 1.48 | 1.48 |
| d43 | 50.01 | 50.01 | 50.01 |
| Incident pupil position | 104.81 | 409.26 | 732.51 |
| Exit pupil position | −135.04 | −135.04 | −135.04 |
| Front principal point position | 138.87 | 414.18 | 88.21 |
| Rear principal point position | 5.01 | −129.99 | −399.99 |

Zoom lens unit data

| Unit | First surface | Focal length | Lens structure length | Front principal point position | Rear principal point position |
|---|---|---|---|---|---|
| 1 | 1 | 165.00 | 63.39 | 33.93 | −18.44 |
| 2 | 12 | −35.00 | 22.98 | 3.06 | −13.43 |
| 3 | 21 | −115.00 | 4.37 | −0.55 | −2.94 |
| 4 | 24 | ∞ | 0.00 | 0.00 | −0.00 |
| 5 | 25 | 56.78 | 99.29 | 10.15 | −120.41 |

(Numerical Embodiment 4)
Unit mm

Surface data

| Surface number | r | d | nd | vd | θgF | Effective diameter | Focal length |
|---|---|---|---|---|---|---|---|
| 1 | 203.26365 | 16.18658 | 1.516330 | 64.14 | 0.5352 | 140.696 | 372.538 |
| 2 | −3744.46544 | 0.62000 | 1.000000 | | | 139.897 | |
| 3 | 255.25309 | 4.00000 | 1.816000 | 46.62 | 0.5568 | 135.379 | −310.743 |
| 4 | 126.62793 | 6.26000 | 1.000000 | | | 129.259 | |
| 5 | 131.51692 | 26.20130 | 1.433870 | 95.10 | 0.5373 | 129.558 | 222.054 |
| 6 | −341.67157 | 2.68000 | 1.000000 | | | 128.657 | |
| 7 | −272.42401 | 4.00000 | 1.754998 | 52.32 | 0.5476 | 127.917 | −236.037 |
| 8 | 525.43544 | 16.75612 | 1.000000 | | | 126.047 | |
| 9 | 233.96987 | 16.69392 | 1.433870 | 95.10 | 0.5373 | 125.391 | 324.664 |
| 10 | −348.50969 | 0.15000 | 1.000000 | | | 124.921 | |
| 11 | 196.59903 | 7.84025 | 1.593490 | 67.00 | 0.5361 | 118.800 | 567.240 |
| 12 | 463.22667 | (Variable) | 1.000000 | | | 117.622 | |
| 13 | 546.75468 | 1.80000 | 1.816000 | 46.62 | 0.5568 | 45.593 | −53.964 |
| 14 | 40.88435 | 1.87376 | 1.000000 | | | 41.270 | |
| 15 | 48.59907 | 9.26002 | 1.720467 | 34.70 | 0.5834 | 41.086 | 40.979 |
| 16 | −70.41276 | 1.50000 | 1.595220 | 67.74 | 0.5442 | 40.183 | −62.568 |
| 17 | 80.28215 | 3.39986 | 1.000000 | | | 36.202 | |
| 18 | −122.91019 | 1.50000 | 1.595220 | 67.74 | 0.5442 | 36.207 | −78.325 |
| 19 | 75.88208 | 0.10000 | 1.000000 | | | 34.743 | |
| 20 | 47.09744 | 3.45252 | 1.720467 | 34.70 | 0.5834 | 34.469 | 127.709 |
| 21 | 92.85223 | 5.00000 | 1.000000 | | | 33.706 | |
| 22 | −80.81558 | 1.40000 | 1.595220 | 67.74 | 0.5442 | 32.829 | −84.129 |
| 23 | 133.73522 | (Variable) | 1.000000 | | | 32.263 | |
| 24 | 181.90523 | 5.00678 | 1.618000 | 63.33 | 0.5441 | 44.487 | 120.769 |
| 25 | −126.03225 | 1.50000 | 1.834000 | 37.16 | 0.5775 | 44.664 | −150.468 |
| 26* | −61694.41637 | 0.20000 | 1.000000 | | | 45.153 | |
| 27 | 129.65297 | 6.18478 | 1.496999 | 81.54 | 0.5374 | 45.754 | 125.846 |
| 28 | −119.59571 | (Variable) | 1.000000 | | | 45.875 | |
| 29 | 530.91679 | 3.86135 | 1.487490 | 70.23 | 0.5300 | 44.802 | 261.151 |
| 30 | −167.81269 | 0.20000 | 1.000000 | | | 44.620 | |
| 31 | 69.55929 | 1.50000 | 1.720467 | 34.70 | 0.5834 | 43.193 | −134.913 |
| 32 | 40.29090 | 6.99815 | 1.496999 | 81.54 | 0.5374 | 41.536 | 85.522 |
| 33 | 692.21392 | (Variable) | 1.000000 | | | 41.036 | |
| 34 | 0.00000 | 10.51965 | 1.000000 | | | 28.815 | |
| 35 | −289.48532 | 1.40000 | 1.882997 | 40.76 | 0.5667 | 24.060 | −62.443 |
| 36 | 68.75741 | 0.15000 | 1.000000 | | | 23.527 | |
| 37 | 34.74080 | 3.50000 | 1.805181 | 25.42 | 0.6161 | 23.445 | 51.153 |
| 38 | 201.94538 | 1.83777 | 1.000000 | | | 22.811 | |
| 39 | 1111.73620 | 1.50000 | 1.910820 | 35.25 | 0.5824 | 21.930 | −45.497 |
| 40 | 40.18353 | 33.00000 | 1.000000 | | | 21.089 | |
| 41 | 192.67363 | 5.00000 | 1.496999 | 81.54 | 0.5374 | 27.562 | 101.165 |

-continued

(Numerical Embodiment 4)
Unit mm

| | | | | | | | |
|---|---|---|---|---|---|---|---|
| 42 | −67.71277 | 1.05263 | 1.000000 | | | 27.884 | |
| 43 | 483.75276 | 1.50000 | 1.882997 | 40.76 | 0.5667 | 27.744 | −42.339 |
| 44 | 34.84033 | 7.00000 | 1.603420 | 38.03 | 0.5835 | 27.520 | 37.797 |
| 45 | −62.13777 | 1.13156 | 1.000000 | | | 27.746 | |
| 46 | −115.11309 | 6.00000 | 1.517417 | 52.43 | 0.5564 | 27.485 | 112.026 |
| 47 | −39.35715 | 1.50000 | 1.882997 | 40.76 | 0.5667 | 27.448 | −71.019 |
| 46 | −106.54261 | BF | 1.000000 | | | 27.865 | |
| Image plane | ∞ | | | | | | |

Aspherical surface data
Twenty-sixth surface

| | | |
|---|---|---|
| K = −6.77646e+004 | A4 = 3.14453e−007 | A6 = −7.70633e−012 |
| A8 = 6.69043e−014 | A10 = −9.36787e−017 | A12 = 5.05543e−020 |

Various data
Zoom ratio 20.00

| | Wide angle | Intermediate | Telephoto |
|---|---|---|---|
| Focal length | 45.00 | 450.00 | 900.00 |
| F-number | 4.50 | 4.50 | 6.50 |
| Angle of field | 18.21 | 1.88 | 0.94 |
| Image height | 14.80 | 14.80 | 14.80 |
| Total lens length | 496.96 | 496.96 | 496.96 |
| BF | 70.00 | 70.00 | 70.00 |
| d12 | 3.60 | 117.04 | 129.76 |
| d23 | 163.25 | 44.12 | 3.00 |
| d28 | 27.04 | 7.83 | 40.44 |
| d33 | 1.85 | 26.75 | 22.55 |
| d48 | 70.00 | 70.00 | 70.00 |
| Incident pupil position | 176.91 | 1448.68 | 3058.95 |
| Exit pupil position | −91.64 | −91.64 | −91.64 |
| Front principal point position | 209.38 | 645.87 | −1052.08 |
| Rear principal point position | 25.00 | −380.01 | −830.00 |

Zoom lens unit data

| Unit | First surface | Focal length | Lens structure length | Front principal point position | Rear principal point position |
|---|---|---|---|---|---|
| 1 | 1 | 225.00 | 101.39 | 49.33 | −34.73 |
| 2 | 13 | −34.75 | 29.29 | 12.67 | −7.06 |
| 3 | 24 | 105.00 | 12.89 | 4.69 | −3.67 |
| 4 | 29 | 125.00 | 12.56 | 1.29 | −7.01 |
| 5 | 34 | −203.63 | 75.09 | −40.82 | −142.69 |

(Numerical Embodiment 5)
Unit mm

Surface data

| Surface number | r | d | nd | vd | θgf | Effective diameter | Focal length |
|---|---|---|---|---|---|---|---|
| 1 | 424.595 | 11.09 | 1.48749 | 70.2 | 0.5300 | 126.35 | 508.12 |
| 2 | −594.285 | 0.20 | | | | 125.51 | |
| 3 | 173.957 | 19.89 | 1.43875 | 94.9 | 0.5343 | 118.14 | 250.89 |
| 4 | −291.286 | 4.00 | 1.72047 | 34.7 | 0.5834 | 116.31 | −294.68 |
| 5 | 807.691 | 16.85 | | | | 113.22 | |
| 6 | 442.688 | 8.68 | 1.43387 | 95.1 | 0.5373 | 108.28 | 654.14 |
| 7 | −791.619 | 0.20 | | | | 106.50 | |
| 8 | 178.245 | 10.17 | 1.43875 | 94.9 | 0.5343 | 101.53 | 417.26 |
| 9 | 6078.912 | 2.50 | 1.74950 | 35.3 | 0.5818 | 99.95 | −1051.34 |
| 10 | 701.579 | 3.00 | | | | 98.21 | |
| 11 | 1195.134 | 10.09 | 1.85478 | 24.8 | 0.6121 | 96.69 | 208.61 |

-continued (Numerical Embodiment 5)
Unit mm

| | | | | | | | |
|---|---|---|---|---|---|---|---|
| 12 | −211.097 | 2.20 | 1.74950 | 35.3 | 0.5818 | 95.28 | −160.99 |
| 13 | 287.381 | (Variable) | | | | 90.30 | |
| 14* | 650.746 | 1.20 | 1.77250 | 49.6 | 0.5521 | 34.49 | −40.43 |
| 15 | 29.914 | 5.46 | | | | 31.13 | |
| 16 | −1357.488 | 1.00 | 1.59522 | 67.7 | 0.5442 | 30.87 | −51.88 |
| 17 | 31.724 | 6.97 | 1.72047 | 34.7 | 0.5834 | 30.14 | 39.14 |
| 18 | −245.341 | 3.24 | | | | 29.56 | |
| 19 | −35.831 | 1.00 | 1.59522 | 67.7 | 0.5442 | 29.30 | −50.38 |
| 20 | 189.754 | 0.20 | | | | 29.59 | |
| 21 | 95.865 | 2.86 | 1.72047 | 34.7 | 0.5834 | 29.74 | 112.99 |
| 22 | −558.084 | (Variable) | | | | 29.71 | |
| 23 | −70.636 | 1.00 | 1.72916 | 54.7 | 0.5444 | 35.49 | −61.34 |
| 24 | 124.130 | 2.96 | 1.85478 | 24.8 | 0.6121 | 37.03 | 140.39 |
| 25 | −4972.820 | (Variable) | | | | 37.47 | |
| 26 | 133.386 | 6.41 | 1.60311 | 60.6 | 0.5414 | 42.87 | 85.43 |
| 27* | −82.961 | 1.00 | | | | 43.27 | |
| 28 | 44.374 | 10.82 | 1.48749 | 70.2 | 0.5300 | 43.66 | 67.00 |
| 29 | −115.328 | 5.00 | | | | 42.62 | |
| 30(Stop) | ∞ | 2.00 | | | | 37.50 | |
| 31 | 73.236 | 7.38 | 1.43875 | 94.9 | 0.5343 | 34.52 | 65.98 |
| 32 | −46.594 | 1.20 | 1.88300 | 40.8 | 0.5667 | 33.02 | −32.26 |
| 33 | 75.284 | 13.46 | | | | 31.40 | |
| 34 | 47.133 | 6.57 | 1.58913 | 61.1 | 0.5406 | 29.35 | 52.92 |
| 35 | −88.341 | 1.00 | | | | 28.33 | |
| 36 | 177.549 | 1.20 | 1.95375 | 32.3 | 0.5997 | 26.28 | −22.15 |
| 37 | 18.943 | 4.80 | 1.64769 | 33.8 | 0.6161 | 24.00 | 44.44 |
| 38 | 49.212 | 35.00 | | | | 23.70 | |
| 39 | 87.063 | 4.31 | 1.51633 | 64.1 | 0.5352 | 29.91 | 94.60 |
| 40 | −110.328 | 15.29 | | | | 29.91 | |
| 41 | −67.625 | 1.00 | 1.88300 | 40.8 | 0.5667 | 27.71 | −22.31 |
| 42 | 28.224 | 9.58 | 1.72825 | 28.5 | 0.6077 | 28.46 | 21.64 |
| 43 | −31.135 | 4.91 | | | | 28.98 | |
| 44 | −21.870 | 1.00 | 1.95375 | 32.3 | 0.5898 | 27.67 | −30.58 |
| 45 | −87.522 | 8.06 | 1.51742 | 52.4 | 0.5564 | 30.38 | 52.40 |
| 46 | −21.424 | (BF) | | | | 31.88 | |
| Image plane | ∞ | | | | | | |

Aspherical surface data

Fourteenth surface

K = 2.35314e+002  A4 = 1.93318e−006  A6 = 4.20833e−010  A8 = −1.72913e−011
A10 = 1.51882e−013  A12 = −7.31823e−016  A14 = 1.83686e−018  A16 = −1.86030e−021

Twenty-seventh surface

K = −2.08328e+000  A4 = 4.85459e−007  A6 = 1.21437e−010  A8 = 1.41513e−013
A10 = 5.06031e−017  A12 = −2.55554e−019  A14 = −5.54086e−022  A16 = 1.16997e−024

Various data
Zoom ratio 19.40

| | Wide angle | Intermediate | Telephoto |
|---|---|---|---|
| Focal length | 50.00 | 400.00 | 970.00 |
| F-number | 4.50 | 4.50 | 8.00 |
| Angle of field | 16.49 | 2.12 | 0.87 |
| Image height | 14.80 | 14.80 | 14.80 |
| Total lens length | 453.00 | 453.00 | 453.00 |
| BF | 55.00 | 55.00 | 55.00 |
| d13 | 4.00 | 111.70 | 129.65 |
| d22 | 130.93 | 5.52 | 12.60 |
| d25 | 8.32 | 26.02 | 1.00 |
| d46 | 55.00 | 55.00 | 55.00 |
| Incident pupil position | 161.92 | 1248.43 | 2562.17 |
| Exit pupil position | −170.62 | −170.62 | −170.62 |
| Front principal point position | 200.84 | 939.26 | −638.17 |
| Rear principal point position | 5.00 | −345.00 | −915.00 |

-continued (Numerical Embodiment 5)
Unit mm

Zoom lens unit data

| Unit | First surface | Focal length | Lens structure length | Front principal point position | Rear principal point position |
|---|---|---|---|---|---|
| 1 | 1 | 230.00 | 88.86 | 4.21 | −58.90 |
| 2 | 14 | −32.50 | 21.93 | 3.40 | −12.18 |
| 3 | 23 | −109.50 | 3.96 | −0.11 | −2.27 |
| 4 | 26 | 68.70 | 140.00 | 18.78 | −175.06 |

TABLE 1

| | | Embodiments | | | | |
|---|---|---|---|---|---|---|
| | | 1 | 2 | 3 | 4 | 5 |
| Focal length at wide angle end: f | | 50 | 50 | 45 | 45 | 50 |
| Focal length at telephoto end: ft | | 900 | 1200 | 450 | 900 | 970 |
| Zoom ratio: Z | | 16 | 24 | 10 | 20 | 19.4 |
| Half angle of field at wide angle end: ω_W | | 17.59 | 16.49 | 19.01 | 18.21 | 16.49 |
| Half angle of field at telephoto end: ω_T | | 1.01 | 0.71 | 1.97 | 0.94 | 0.87 |
| Focal length of first lens unit: f1 | | 225 | 208 | 165 | 225 | 230 |
| Focal length of second lens unit: f2 | | −33 | −33 | −35 | −34.75 | −32.5 |
| Focal length of third lens unit: f3 | | −118.37 | −106.77 | −115 | 105 | −109.5 |
| Focal length of fourth lens unit: f4 | | 53.57 | 57.71 | 56.78 | 125 | 68.7 |
| Focal length of fifth lens unit: f5 | | | | | −203.63 | |
| Focal length of first lens sub unit: f11 | | 25579.59 | 3088.6 | 3382.88 | 7394.45 | 365.51 |
| Focal length of second lens sub unit: f12 | | 195.1 | 185.19 | 161.61 | 207.32 | 333.48 |
| Rear principal point position of first lens unit: OK1 | | −45 | −44.72 | −18.44 | −34.73 | −58.9 |
| Rear principal point distance of first lens sub unit: OK11 | | −3573.93 | −507.32 | −210.15 | −765.7 | −28.89 |
| Imaging magnification of final lens unit: βr | | −2.37 | −2.18 | −2.00 | 2.04 | −2.35 |
| Conditional expressions | | | | | | |
| (1) | OK1/f1 | −0.2 | −0.22 | −0.11 | −0.15 | −0.26 |
| (2) | OK11/f1 | −15.88 | −2.44 | −1.27 | −3.4 | −0.13 |
| (3) | ft/f1 | 4 | 5.77 | 2.73 | 4 | 4.22 |
| (4) | νd11p − νd11n | 27.99 | 38.72 | 30.02 | 30.15 | 47.88 |
| (5) | νd12 | 95.1 | 81.54 | 81.42 | 81.42 | 75.12 |
| (6) | f1/f2 | −6.82 | −6.3 | −4.71 | −6.47 | −7.08 |
| (7) | (θ2p − θ2n)/(ν2p − ν2n) | −0.00158 | −0.00106 | −0.00121 | −0.0013 | −0.0014 |
| (8) | (θ1p − θ1n)/(ν1p − ν1n) | −0.00026 | −0.00042 | −0.00106 | −0.00051 | −0.00080 |
| (9) | f2/(2 × fw × tan(ω_W)) | −1.04 | −1.11 | −1.13 | −1.17 | −1.1 |
| (10) | βr | −2.37 | −2.18 | −2.00 | 2.04 | −2.35 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-122526, filed Jun. 13, 2014, and Japanese Patent Application No. 2014-122528, filed Jun. 13, 2014, which are hereby incorporated by reference herein in their entirety.

What is claimed is:

1. A zoom lens comprising, in order from an object side to an image side:

a first lens unit having a positive refractive power that does not move for zooming;

a second lens unit having a negative refractive power that moves during the zooming;

at least one lens unit that moves during the zooming; and a rear lens group, wherein the first lens unit comprises a first lens sub unit that does not move for focusing, and a second lens sub unit having a positive refractive power that moves during the focusing, wherein the first lens sub unit comprises a negative lens and a positive lens, and wherein the following conditions are satisfied:

$$-25.00 < OK11/f1 < -0.80;$$

$$2.00 < ft/f1 < 7.00; \text{ and}$$

$$-0.30 < OK1/f1 \leq -0.11,$$

where f1 represents a focal length of the first lens unit, OK11 represents a distance on an optical axis from a lens surface closest to the image side of the first lens sub unit to a rear principal point position of the first lens sub unit, ft represents a focal length of the zoom lens at a telephoto end, and OK1 represents a distance on the optical axis from a lens surface closest to the image side of the first lens unit to a rear principal point position of the first lens unit, provided that a direction from the object side toward the image side is a positive direction.

2. The zoom lens according to claim 1, wherein the following condition is satisfied:

$$20.00 < vd11p - vd11n < 48.00,$$

where vd11p represents an average value of Abbe constants of the positive lenses forming the first lens sub unit, and vd11n represents an average value of Abbe constants of the negative lenses forming the first lens sub unit.

3. The zoom lens according to claim 1, wherein the following condition is satisfied:

$$70.00 < vd12 < 100.00,$$

where vd12 represents an average value of Abbe constants of lenses forming the second lens sub unit.

4. The zoom lens according to claim 1, wherein the first lens sub unit comprises a positive lens as a lens closest to the object side, and a negative lens as a lens closest to the image side.

5. The zoom lens according to claim 1, wherein the first lens sub unit comprises, in order from the object side to the image side, a positive lens, a negative lens, a positive lens, and a negative lens.

6. The zoom lens according to claim 1, wherein the following condition is satisfied:

$$-8.00 < f1/f2 < -3.00,$$

where f2 represents a focal length of the second lens unit.

7. The zoom lens according to claim 1, wherein the following condition is satisfied:

$$-2.50 \times 10^{-3} < (\theta 2p - \theta 2n)/(v2p - v2n) < -0.50 \times 10^{-3},$$

where v2p and θ2p represent average values of Abbe constants and relative partial dispersions of positive lenses forming the second lens unit, respectively, and v2n and θ2n represent average values of Abbe constants and relative partial dispersions of negative lenses forming the second lens unit, respectively, provided that a relative partial dispersion θ is expressed as:

$$\theta = (Ng - NF)/(NF - NC),$$

where Ng represents a refractive index with respect to a g-line, NF represents a refractive index with respect to an F-line, Nd represents a refractive index with respect to a d-line, and NC represents a refractive index with respect to a C-line.

8. The zoom lens according to claim 1, wherein the following condition is satisfied:

$$-8.00 \times 10^{-4} < (\theta 1p - \theta 1n)/(v1p - v1n) < -1.50 \times 10^{-4},$$

where v1p and θ1p represent average values of Abbe constants and relative partial dispersions of positive lenses forming the first lens unit, respectively, and v1n and θ1n represent average values of Abbe constants and relative partial dispersions of negative lenses forming the first lens unit, respectively.

9. An image pickup apparatus, comprising:
a zoom lens comprising, in order from an object side to an image side:
  a first lens unit having a positive refractive power that does not move for zooming;
  a second lens unit having a negative refractive power that moves during the zooming;
  at least one lens unit that moves during the zooming; and
  a rear lens group,
  wherein the first lens unit comprises a first lens sub unit that does not move for focusing, and a second lens sub unit having a positive refractive power that moves during the focusing,
  wherein the first lens sub unit comprises a negative lens and a positive lens, and
  wherein the following conditions are satisfied:

$$-25.00 < OK11/f1 < -0.80;$$

$$2.00 < ft/f1 < 7.00; \text{ and}$$

$$-0.30 < OK1/f1 \leq -0.11,$$

where f1 represents a focal length of the first lens unit, OK11 represents a distance on an optical axis from a lens surface closest to the image side of the first lens sub unit to a rear principal point position of the first lens sub unit, ft represents a focal length of the zoom lens at a telephoto end, and OK1 represents a distance on the optical axis from a lens surface closest to the image side of the first lens unit to a rear principal point position of the first lens unit, provided that a direction from the object side toward the image side is a positive direction; and
an image pickup element that photoelectrically converts an optical image formed by the zoom lens.

10. A zoom lens comprising, in order from an object side to an image side:
  a first lens unit having a positive refractive power that does not move for zooming but to move during focusing;
  a second lens unit having a negative refractive power that moves during the zooming;
  at least one lens unit that moves during the zooming; and
  a rear lens group including an aperture stop and having a positive refractive power, wherein the rear lens group does not move for the zooming, and
  wherein the following conditions are satisfied:

$$2.00 < ft/f1 < 7.00;$$

$$-8.00 < f1/f2 < -3.00; \text{ and}$$

$$-0.30 < OK1/f1 \leq -0.15,$$

where ft represents a focal length of the zoom lens at a telephoto end, f1 represents a focal length of the first lens unit, OK1 represents a distance along an optical axis between a lens surface closest to the image side in the first lens unit and a rear principal point position of the first lens unit, and f2 represents a focal length of the second lens unit.

11. The zoom lens according to claim 10, wherein the following condition is satisfied:

$$-1.5 < f2/(2 \times fW \times \tan(\omega\_W)) < -0.7,$$

where fW represents a focal length of the zoom lens at a wide angle end, and ω_W represents a half angle of field of the zoom lens at the wide angle end.

12. The zoom lens according to claim 10 comprising, in order from the object side to the image side:
  the first lens unit;
  the second lens unit;
  a third lens unit having a negative refractive power that moves during the zooming; and
  a fourth lens unit including an aperture stop and having a positive refractive power that does not move for the zooming,
  wherein the following condition is satisfied:

$$-3.0 < \beta r < -1.8,$$

where βr represents an imaging magnification of the fourth lens unit.

13. The zoom lens according to claim 10, wherein the first lens unit comprises, in order from the object side to the image side, a first lens sub unit that does not move for the focusing, and a second lens sub unit having a positive refractive power that moves toward the object side during focusing from infinity to proximity.

14. An image pickup apparatus, comprising:
- a zoom lens comprising, in order from an object side to an image side:
  - a first lens unit having a positive refractive power that does not move for zooming but to move during focusing;
  - a second lens unit having a negative refractive power that moves during the zooming;
  - at least one lens unit that moves during the zooming; and
  - a rear lens group including an aperture stop and having a positive refractive power, wherein the rear lens group does not move for the zooming, and
  wherein the following conditions are satisfied:

$2.00 < ft/f1 < 7.00;$ $-8.00 \leq f1/f2 < -3.00;$ and $-0.30 < OK1/f1 \leq -0.15,$ where ft represents a focal length of the zoom lens at a telephoto end, f1 represents a focal length of the first lens unit, OK1 represents a distance along an optical axis between a lens surface closest to the image side in the first lens unit and a rear principal point position of the first lens unit, and f2 represents a focal length of the second lens unit; and
- an image pickup element that photoelectrically converts an optical image formed by the zoom lens.

* * * * *